United States Patent

Dill

[15] 3,683,116

[45] Aug. 8, 1972

[54] TERRESTRIAL INTERFACE UNIT

[72] Inventor: George D. Dill, Vienna, Va.

[73] Assignee: Communications Satellite Corporation, Washington, D.C.

[22] Filed: July 16, 1969

[21] Appl. No.: 842,838

[52] U.S. Cl. .................................179/15 AQ, 325/4

[51] Int. Cl. ...............................................H04j 3/16

[58] Field of Search.325/4; 179/15 BY, 15 AS, 15 A, 179/15 AT, 15 BF, 15 BS; 343/100 ST

[56] References Cited

UNITED STATES PATENTS

| | | | |
|---|---|---|---|
| 3,042,752 | 7/1962 | Fulmer | 179/15 AS |
| 3,304,373 | 2/1967 | Wright | 179/15 AS |
| 3,517,312 | 6/1970 | Yamato | 325/4 |

*Primary Examiner*—Ralph D. Blakeslee
*Attorney*—Sughrue, Rothwell, Mion, Zinn & Macpeak

[57] ABSTRACT

In a demand assigned multiple access system, a chosen satellite RF frequency band is divided on the basis of assigning a single voice channel per RF carrier. The RF band, thus divided, forms a "pool" of frequencies. The demand assigned multiple access system is fully variable, allowing all circuits to be selected by any station on demand. Thus, neither end of a channel is permanently associated with any terminal point, and the channels are paired to form a connection as required within the demand assignment pool. The system does not require a central station for system control, but instead uses a demand assignment signaling and switching unit for self-assignment of channels based on continually updated channel allocation status data provided via a common signaling channel. The common signaling channel is used to continuously apprise each earth station demand assignment signaling and switching unit of the availability of pool channels and to establish links directly with other stations. The demand assigned multiple access terminal is designed to be operated with all types of international telephone exchanges. Because of the variations in workings of the several different types of telephone exchanges, two basic types of telephone central to demand assignment multiple access terminal interfaces are provided. The first type of interface provides for individual channel signaling. This entails the communication of all signaling with the individual access circuits. The second type of interface provides for common channel signaling. This entails the communication of all signaling between the telephone central and the demand assignment multiple access terminal via a separate signaling channel. In all cases, the combined operation of the terrestrial interface unit and the demand assignment signaling and switching unit is such that the signaling between the telephone central and the demand assigned multiple access terminal is the same as if it were between two telephone centrals.

8 Claims, 51 Drawing Figures

INVENTOR

GEORGE D. DILL

TERRESTRIAL INTERFACE UNIT

CROSS-REFERENCE TO RELATED APPLICATION

This application is related to the application of John Puente et al., Ser. No. 719,138, filed Apr. 5, 1968 now U.S. Pat. No. 3,564,147, for LOCAL ROUTING CHANNEL SHARING SYSTEM AND METHOD FOR COMMUNICATIONS VIA A SATELLITE RELAY, and assigned to the assignee of the present application.

BACKGROUND OF INVENTION

1. Field of the Invention.

This invention generally relates to an interface between a telephone central and a demand assigned multiple access system for communications via a satellite relay, and more particularly to a terrestrial interface unit and method suitable for either individual channel signalling or common channel signaling.

2. Description of the Prior Art.

Commercial satellite communications systems in operation today make use of full-time dedicated FDM/FM carriers with either single or multiple destinations. In both cases, however, extensive use is made of circuits preassigned between any two points in the system. For example, Country A may have 10 carriers assigned to it out of which 5 are assigned for communication with Country B, three are for communications with Country C, and one apiece for communications with Countries D and E, respectively. The channel assignment is made on the basis of expected traffic between countries, and once a channel is assigned between any two countries, its availability becomes limited to those two countries. This preassignment of circuits provides efficient system operation for the large circuit group of countries which have sufficiently heavy traffic. However, for the developing nations, which will not have a very heavy traffic in the near future, a preassigned communications network becomes very inefficient. In fact from a traffic point of view, as the number of circuits per group is decreased, the utilization of satellite circuits for a given grade of service becomes increasingly inefficient and, ultimately, impractical when the link has a fractional circuit requirement. For example, present international standards assign a single channel between two countries if the expected traffic between those two countries is 150 minutes per day. Thus, if the traffic is at the minimum of 150 minutes per day, and the channel is assigned between the aforesaid two countries, then the assigned channel will not be used for 21½ hours during the day. If a substantial number of channels are assigned to these minimum traffic routes, there is a tremendous waste of the satellite bandwidth resulting in inefficient operation.

One solution to the problem of these lightly leaded links is to share a pool of satellite circuits among all earth stations concerned. The circuits are then assigned on demand, forming a temporary connection on a per circuit basis between any two pool-member earth stations within the region covered by the satellite. At the end of the communication, the circuits are returned to the demand assigned satellite pool. By going to a sharing system in which the channels are not pre-assigned but may be taken by any ground location on demand, the overall efficiency of the satellite system can be greatly improved.

The aforementioned application of John Puente et al., Ser. No. 719,138, filed Apr. 5, 1968, for LOCAL ROUTING CHANNEL SHARING SYSTEM AND METHOD FOR COMMUNICATIONS VIA A SATELLITE RELAY, describes a demand assigned multiple access system. In this system, a chosen satellite RF frequency band is divided on the basis of assigning a single voice channel per RF carrier. The RF band, thus divided, forms a "pool" of frequencies. This system is fully variable, allowing all circuits to be selected by any station on demand. Thus, neither end of a channel is permanently associated with any terminal point, and the channels are paired to form a connection as required in the demand assignment pool. The system does not require a central station for system control, but instead uses a Demand Assignment Signaling and Switching Unit (DASS) for self-assignment of channels based on continually updated channel allocation status data provided via a Common Signaling Channel (CSC). The CSC is used to continuously apprise each earth station DASS of the availability of pool channels and to establish links directly with other stations.

In operation, each earth station periodically sends out a burst signal containing information about the channels presently being used, requested, or released by its own ground location. The bursts are transmitted via the CSC and are time division multiplexed (TDM) to arrive at the proper times at the satellite and at all ground stations. The bursts from each station are received by all stations, and the data of all channels available in the entire system is memorized and continuously updated at each station. If a subscriber of Country A requests to communicate with a subscriber in Country B, and if an access circuit is available at Country A, a presently unused channel is selected at Country A, and a request for this channel and for the ability to communicate to Country B is sent via the CSC. The burst message containing this request passes through the satellite and is transponded to all earth stations within the designated community including the earth station that originated the message. When the originating earth station receives back its own burst in which it made a request for the selected channel, the message is examined to see if the requested channel is still available. The purpose of examining whether or not the requested channel is still available is to prevent the problem of double seizure of a channel. In other words, it is possible for Country A to select a channel subsequent to the time that Country C has requested the same channel but prior to the time that Country A receives a burst from Country C informing Country A that the channel has been requested. However, in accordance with this system, the channel is not seized until the request goes through the satellite and back to the requesting station. During the time it takes for the round trip transmission through the satellite, if another ground station had first requested the same channel, this will be noted by ground Station A. Thus, when its own request comes back through the satellite, an indication is provided that the requested channel has become busy. Assuming that the requested channel is not busy, the channel frequency is seized. The subscriber is then provided with a channel through which he can communicate with someone in Country B.

At the addressed station in Country B, the request from Country A is noted, and an examination of the requested channel is undertaken to see if it is presently used or unused. Assuming that the requested channel is presently unused and that Country B has an available access circuit, Country B transmits via its TDM burst a message which names Country A and confirms that the request has been received and is acceptable.

In the telephony art, a communication circuit between two locations comprises a pair of channels. One channel is used for transmission from the first to the second location, and a different channel is used for transmission from the second to the first location. This holds true in satellite communications of the FDM type. Thus, although Station A, as described above, has picked a channel for transmitting messages to Station B, Station B has yet to pick a channel for transmitting messages to Station A, thereby forming the communication circuit. This is generally accomplished by pairing channels. For example, assuming that there are twenty-four channels, channels 1 thru 12 are paired with channels 13 thru 24. Thus, the requesting station selects one channel of the pair, and the recipient station then necessarily selects the other channel of the pair.

SUMMARY OF THE INVENTION

In accordance with the present invention, telephone circuits are interconnected between the local telephone central (CT) and the Demand Assigned Multiple Access (DAMA) terminal via a Terrestrial Interface Unit (TIU). The TIU permits the operation of the DAMA terminal with most types of models of international telephone exchanges. Because of the variations in workings of the various telephone exchanges, two basic types of CT to DAMA terminal interface are provided: (1) individual channel signaling, and (2) common channel signaling.

The individual channel signaling interface entails the communication of all signaling with the individual access circuits. Modified line signaling and trunk circuit relay group equipments are required at the earth station such that the normal signaling of a CT may be detected and appropriate responses returned to the CT without requiring any modifications to the operation of the existing CT.

The common channel signaling interface entails the communication of all signaling between the CT and the DAMA terminal via a separate signaling channel.

In either of the individual channel signaling or the common channel signaling cases, the combined operation of the TIU and the DASS unit is such that the signaling between the CT and DAMA terminal is the same as if it were between two CT's. The type of terrestrial interface to be implemented depends primarily on the following parameters:

a. Type and model of the international exchange.

b. Predicted number of access circuits to be operated between the CT and the DAMA terminal.

c. Operating time to establish a circuit through the satellite.

d. Cooperative utilization of the preassigned circuits and demand assigned circuits.

For example, if the DAMA terminal is to be interfaced with an existing electromechanical working CT and the predicted loading for the next 10 years is low, then the application of individual channel signaling type of TIU may be preferred in that it can be implemented using standard design signaling and switching hardware at the DAMA terminal and no modifications are required to the CT. As the predicted number of required access circuits grows, consideration must be given to the possible application of common channel signaling in that this mode of operation requires less operating time to establish a circuit through the satellite and thereby minimizes the past dialing delay.

BRIEF DESCRIPTION OF THE DRAWINGS

The specific nature of the invention will clearly appear from the following description and from the accompanying drawings, in which.

DESCRIPTION OF THE PREFERRED EMBODIMENTS

The DAMA system can be conveniently divided into two major categories for descriptive purposes:

1. Common Control Equipment
2. Full Duplex Channel Units

The Common Control Equipment, as the name implies, is that which is shared by all the channel units and of which only one set is required at each local installation. The Common Control Equipment includes the following major subsystems:

1. Demand Assignment Signaling and Switching Unit (DASS).
2. Timing and Frequency Unit (TFU).
3. IF Subsystem.

The Common Control Equipment forms the baseline of the system and need not be expanded further as more channel units are added.

Each channel unit is composed of the following subsystems:

1. PCM Coder-Decoder (CODEC)
2. Channel Frequency Synthesizer
3. Phase shift Key Modulator-Demodulator (4 $\phi$ PSK Modem)
4. Transmit/Receive Synchronizer
5. Voice Detector A channel unit is required for every voice circuit to be provided, but channel units can be added to the installation one at a time or in groups without modifying the Common Control Equipment.

1. FUNCTIONAL DESCRIPTION OF THE SYSTEM.

Figure 1:
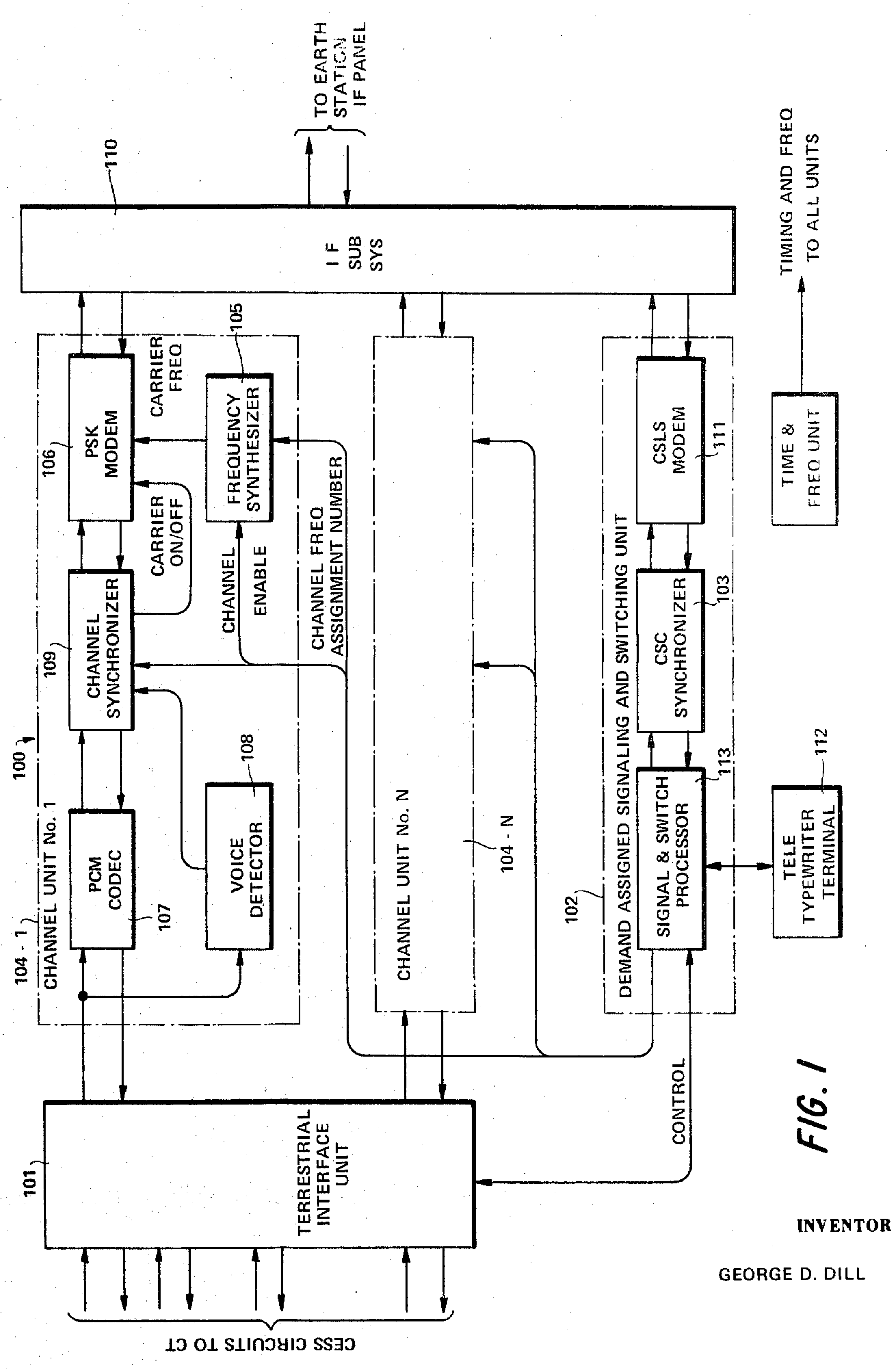
FIG. 1 is a functional block diagram of a demand assigned multiple access terminal and terrestrial interface unit.
Figure 2A:
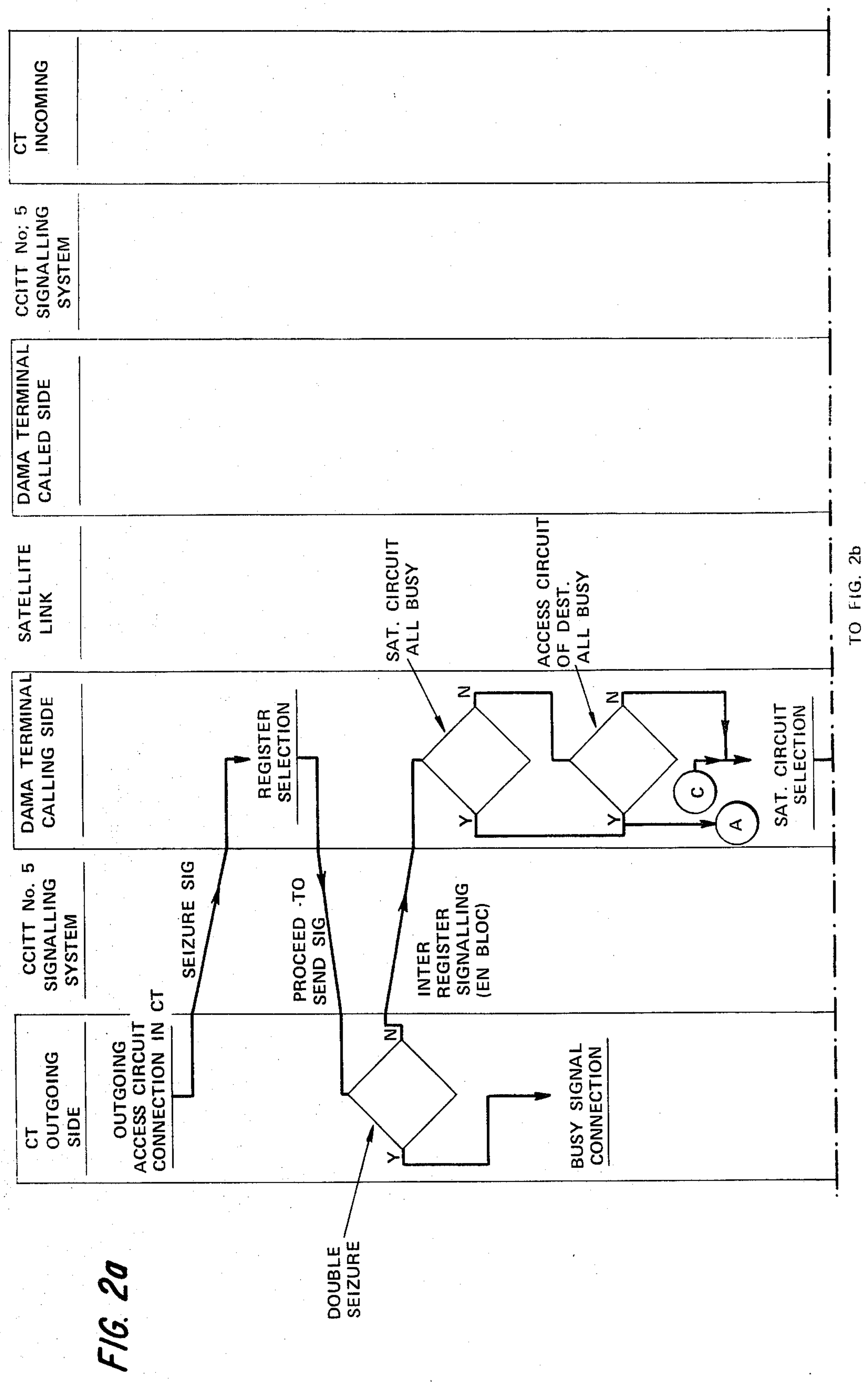
FIGS. 2*a* through 2*g*, taken together, form a flow diagram of a typical call signaling procedure.
Figure 2B:
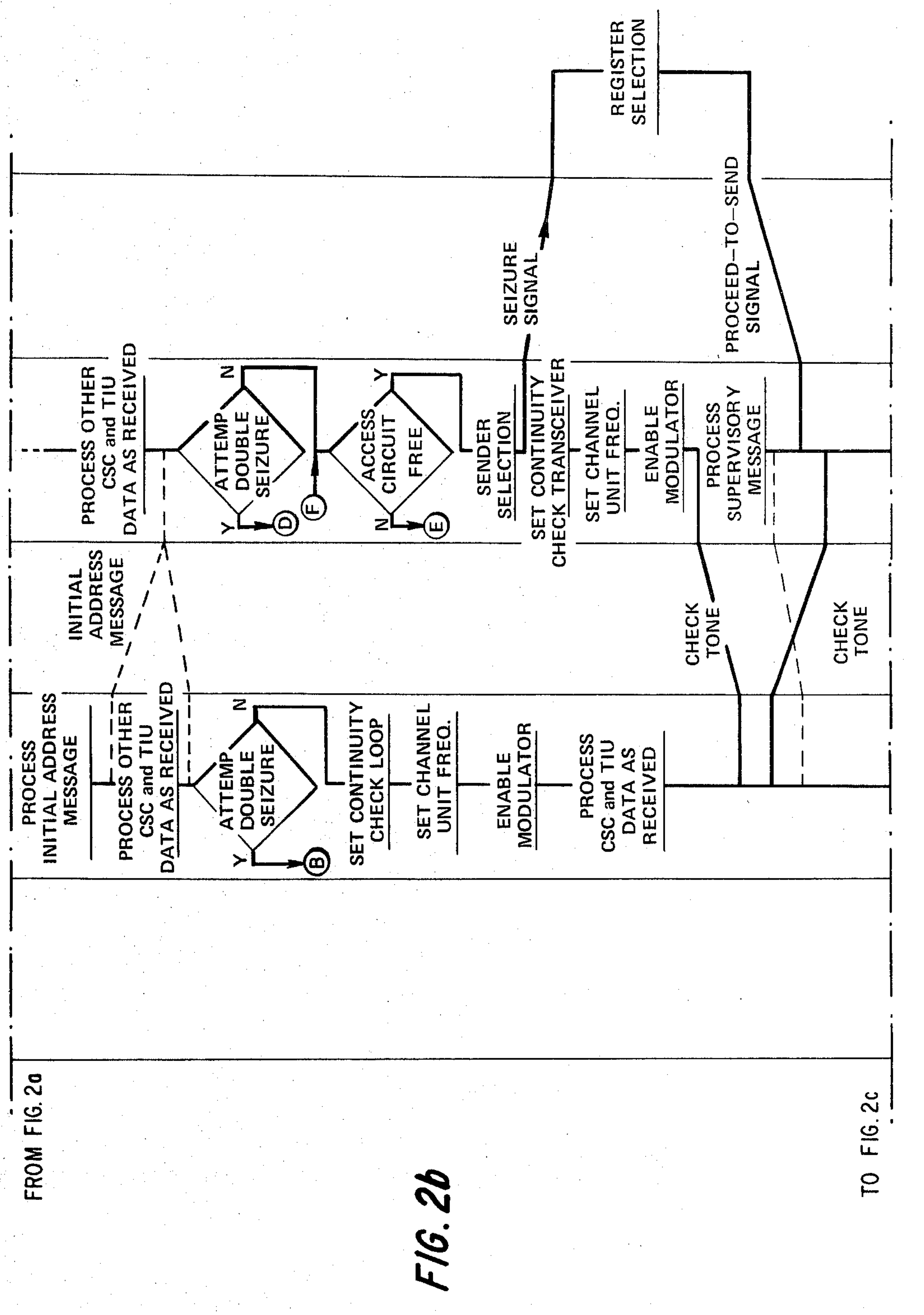
Figure 2C:
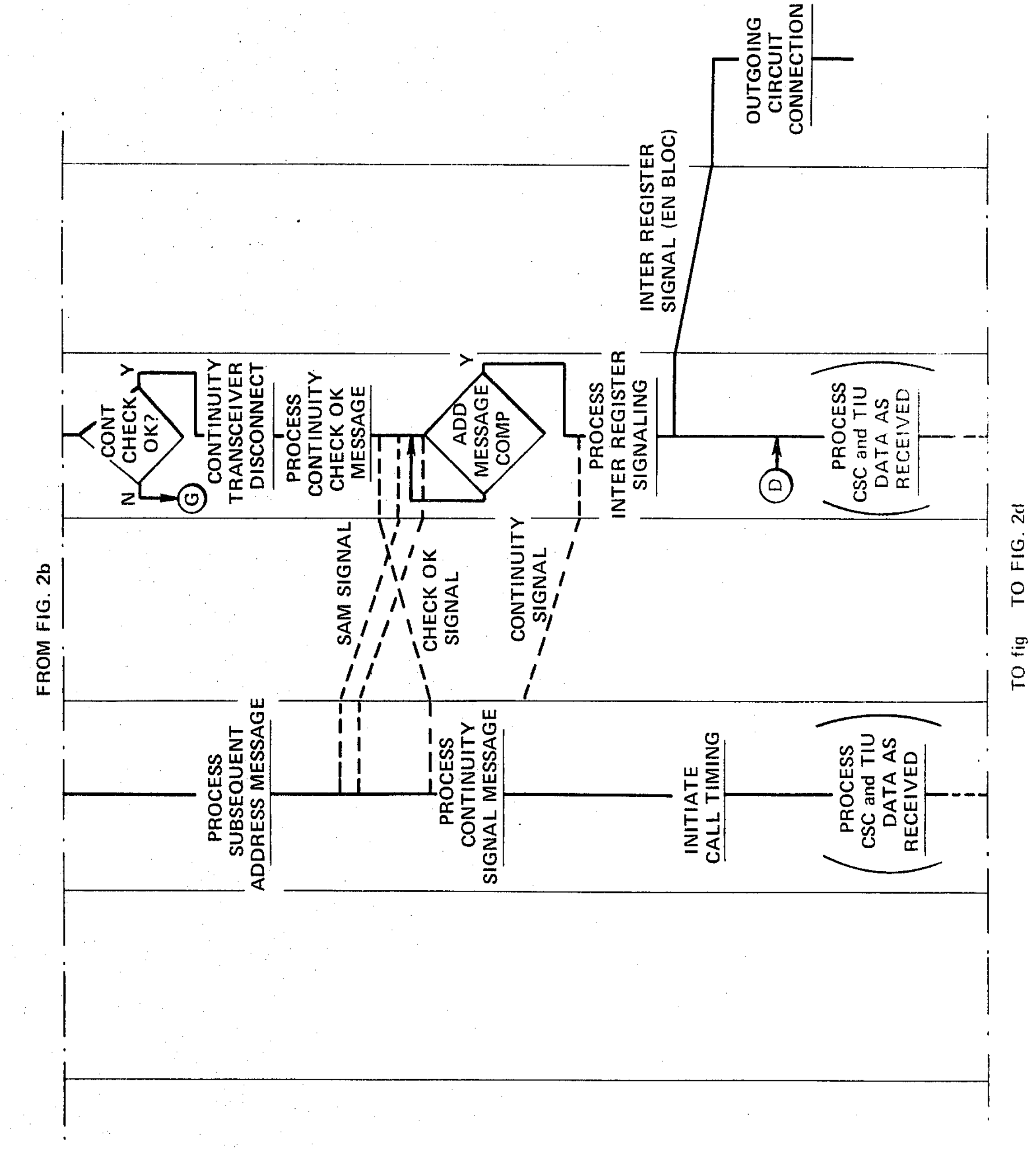
Figure 2D:
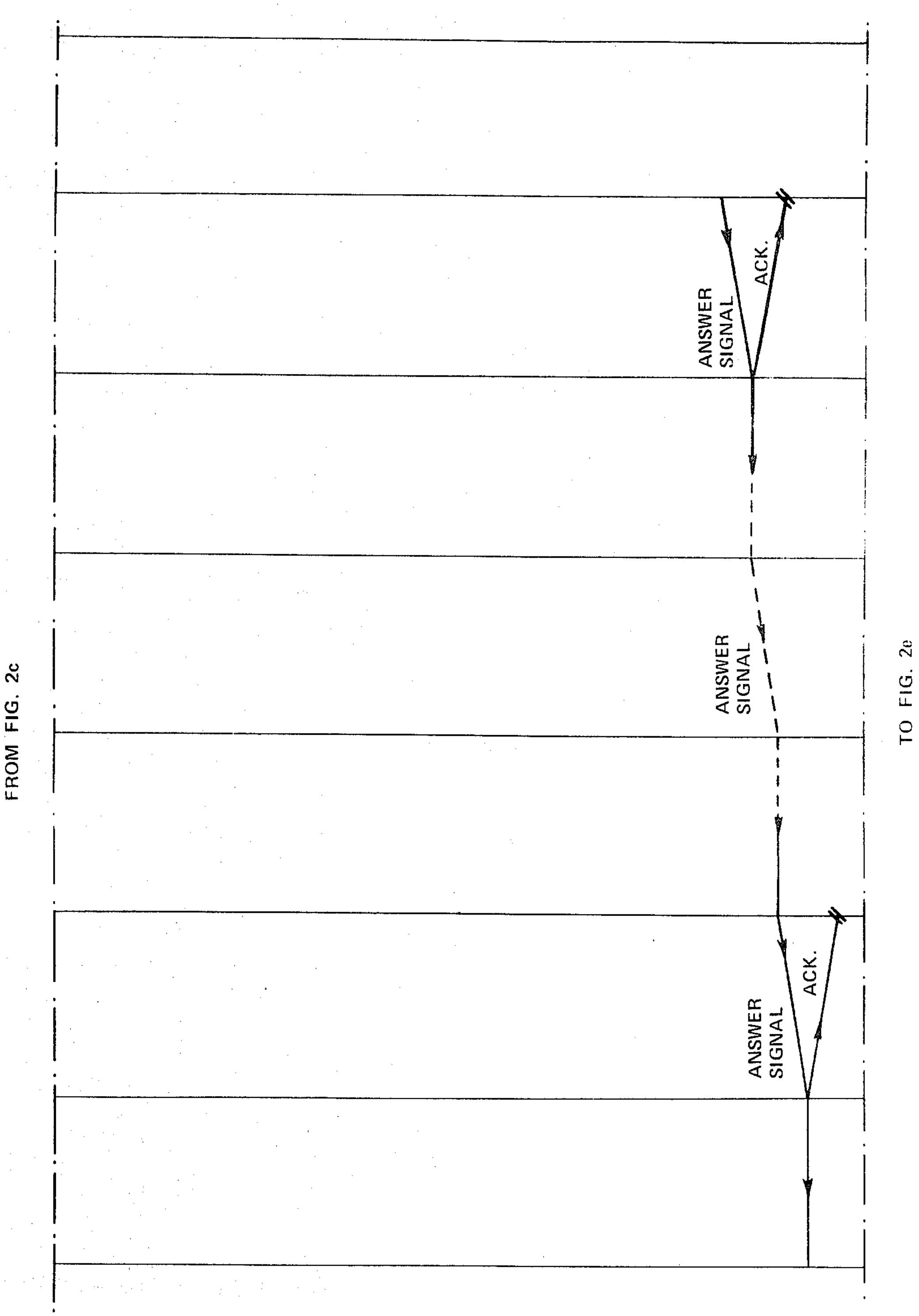
Figure 2E:
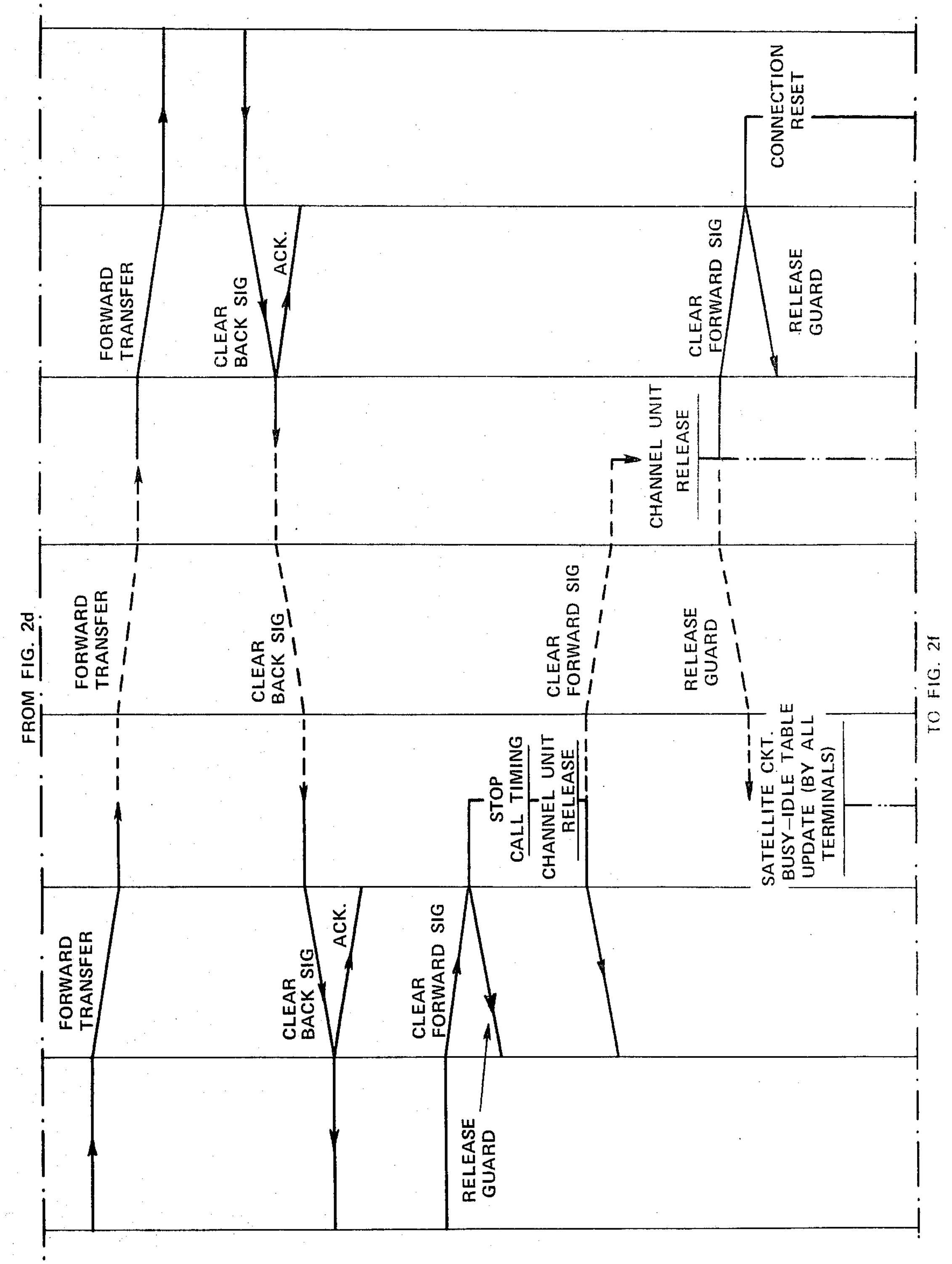
Figure 2F:
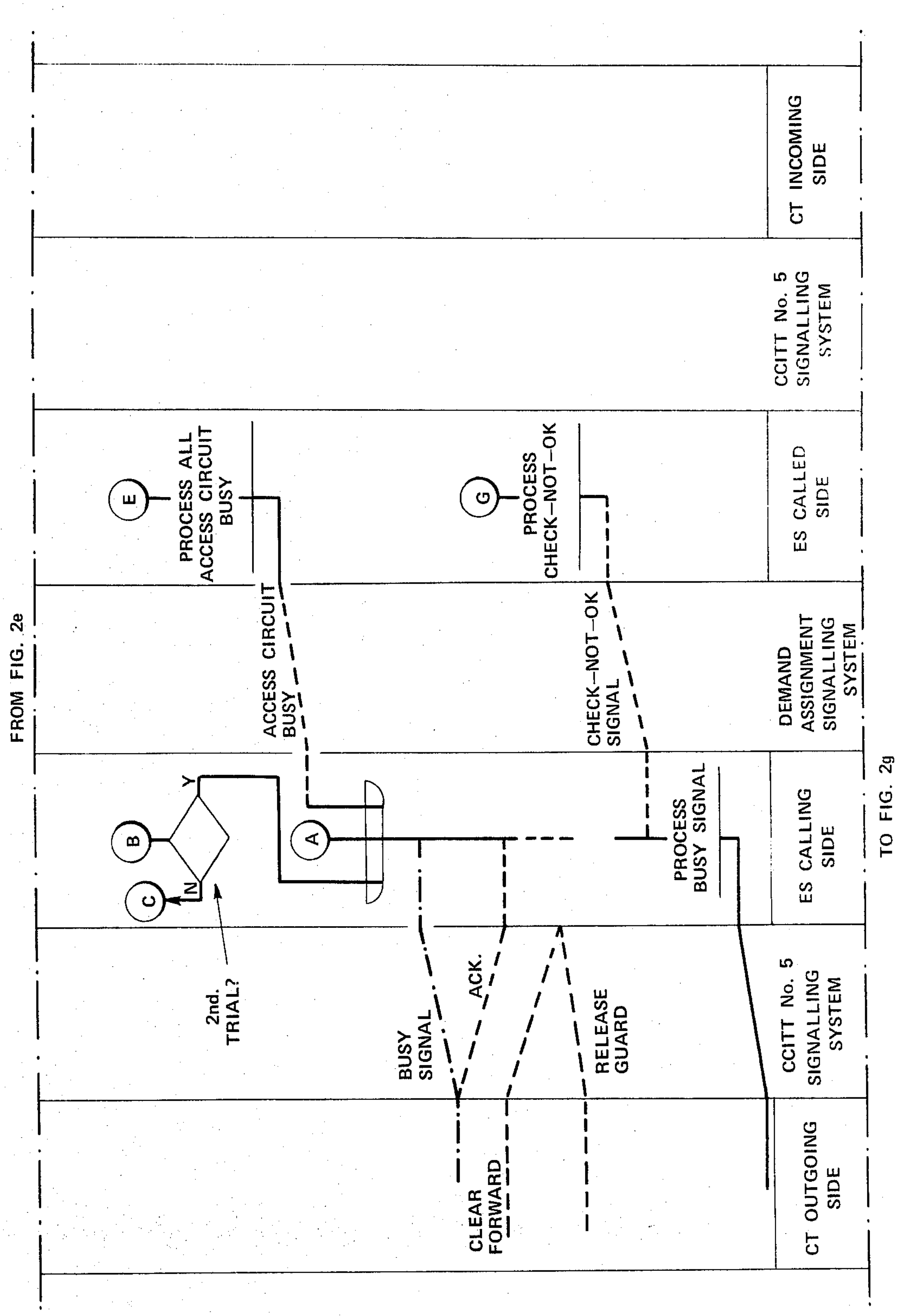
Figure 2G:
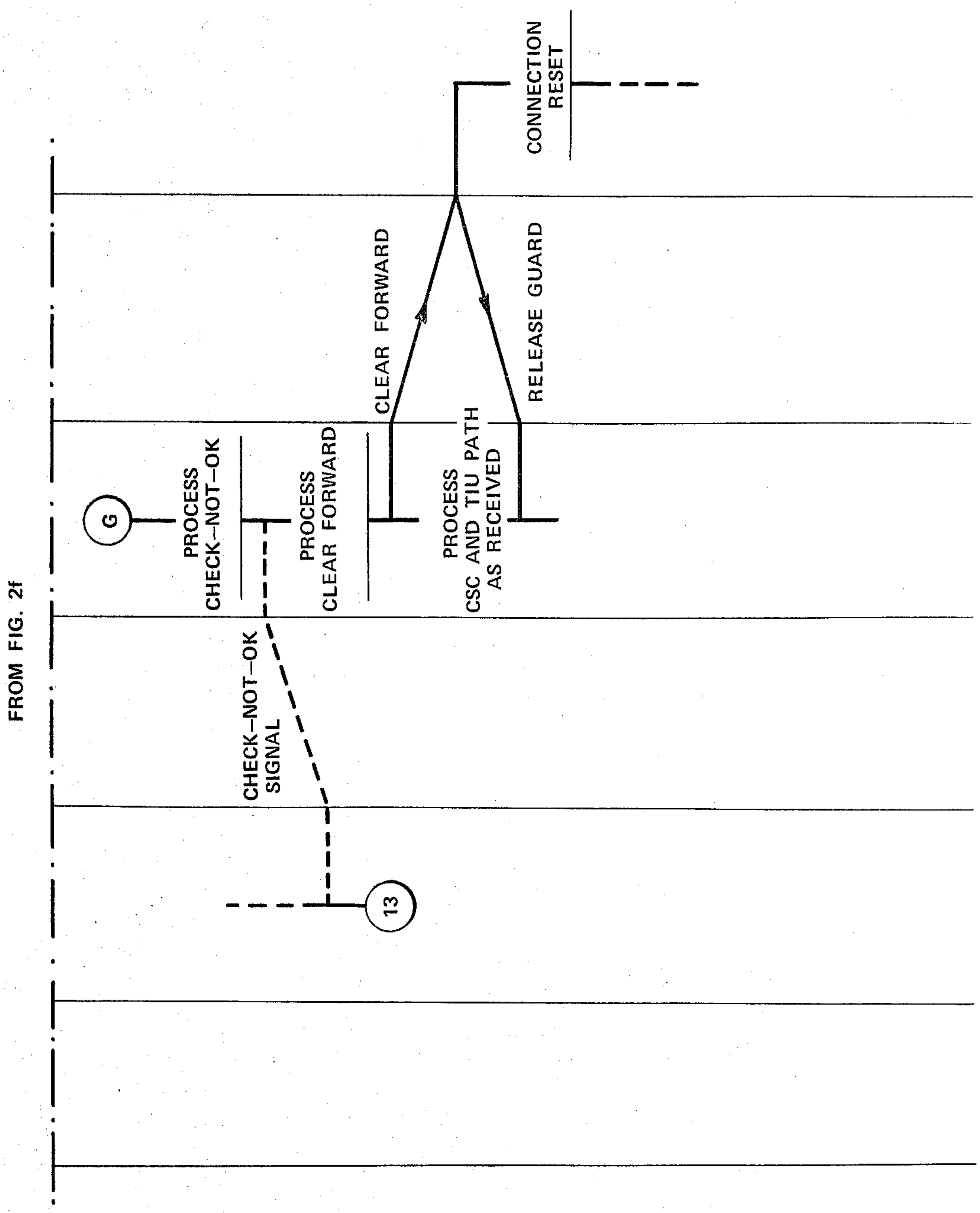
Figure 2H:
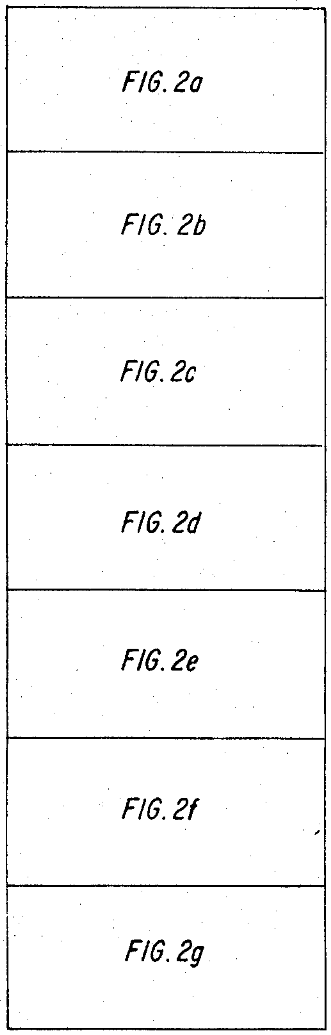
FIG. 2*h* is a map of FIGS. 2*a* through 2*g*.
Figure 3D:
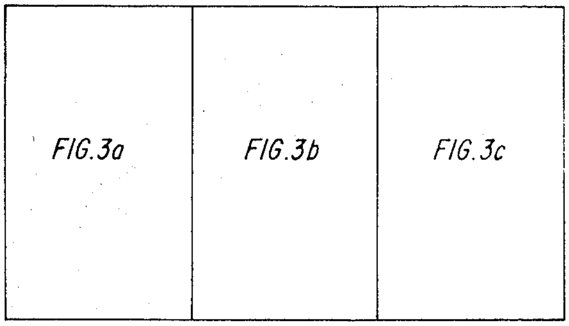
FIG. 3*d* is a map of FIGS. 3*a* to 3*c*.

FIG. 1 is a block diagram of a typical installation. Telephone circuits from the local CT are linked to the DAMA terminal 100 via the Terrestrial Interface Equipment 101. This equipment provides for voice circuit switching and call signaling as required to systematically initiate, supervise and terminate all calls. When a call request is received, the DASS 102 automatically selects a frequency pair from the pool of available frequencies and alerts the destination station of an incoming call and the frequency assignment for response. All DASS units utilize the signaling information disseminated by the CSC 103 to update a channel table such that the frequencies just assigned are unavailable for new calls. Since the request for frequency assignment is made over a time division multiple access channel, priority is assigned on a first requestor basis so that if dual or multiple seizure of the same channel is attempted, it is immediately resolved. Furthermore, at each site frequency selections are chosen randomly to further reduce the probability of attempted multiple seizure.

The frequency selected is provided to the channel units 104-1 to 104-N by means of a frequency synthesizer 105 which is capable of generating any of the 800 discrete frequencies required using digital codes provided by DASS 102. This is used both for the outgoing carrier and the received signal local oscilator. Channel pairings are based on the common use of the synthesizer for receive and transmit signals.

Upon turn-on of the modem 106, the DASS unit 102 then conducts a two-way circuit continuity check. Once the call has been established, the voice signal received by the channel unit **104-*i* is sent to a PCM CODEC 107** which transforms the analog voice to a digital signal for outgoing transmission and from a digital to an analog signal for returning signals.

The content of the voice channel coming from the CT is detected by a voice detector 108 which is used to gate the channel carrier on or off. This conserves satellite power as a function of talker activity. The digital bit-stream in and out of the voice CODEC 107 are synchronized by the Transmit-Receive Synchronizer 109 where timing, buffering and framing functions are performed. The PSK Modem 106 modulates the assigned carrier frequency with the outgoing bit stream and coherently demodulates the incoming bursts by recovering carrier and bit timing associated with the received signals. The modulated carriers, both outgoing and incoming, are passed through a common IF subsystem 110 which interfaces with the earth station up- and down-converters at IF. The carrier used for CSCS Modem 111 is also passed through the IF subsystem.

When the call is completed, a control signal from the CT allows DASS 102 to return that circuit to the frequency pool for reassignment. This information is passed to all stations via the CSC 103. The duration of the allocation is recorded by DASS 102.

Of additional note is the fact that the CSC provides an all-station teletype engineering service circuit without interfering with CSC routine operation. Access to and from this circuit is by means of a conventional teletypewriter 112 associated with DASS 102.

An all-station voice order wire, if required, can be provided by dedicating one or two pairs of voice channels to this purpose. A subroutine in the DASS program can be used to prevent these channels from being assigned to external voice links.

2. DEMAND ASSIGNED SIGNALING AND SWITCHING UNIT

Each Demand Assigned Signaling and Switching (DASS) unit is composed of a common signaling channel synchronizer (CSCS), a PSK modem, and a Signaling and Switching Processor (SSP). The purpose of the DASS Unit is to control and monitor the signaling and switching of the terrestrial and satellite links. A typical operational flow diagram for a call is shown in FIGS. **2*a* through 2*g***.

The inter unit signaling between DAMA Terminals permits rapid connection and release of individual voice channels between any one international exchange and another as they are required. Thus, a prescribed number of satellite circuits may be randomly time shared on a demand basis among a community of DAMA terminals whose composite total sum of access circuits is greater than the total number of satellite circuits. Moreover, a lesser number of terrestrial access circuits and channel equipment are required between the CT and DAMA terminal because all access circuits may be used for all destinations—they are not dedicated to a preassigned destination.

All signaling between DASS units is via a single time-division multiplexed "broadcast" channel. This feature plus the common signaling format allows additional demand assigned terminals to be added to a community of nations in common view of a satellite without requiring any hardware or operational modifications or changes to those terminals already in existence. Similarly, if any demand assigned terminal decides to perform maintenance or has a failure, the remaining demand assigned terminals are unaffected.

The Common Signaling Channel is the TDMA channel used for exchanging routing information between stations in the system. Each station has a unit termed the Common Signaling Channel Synchronizer whose functions are to synchronize that station's burst with the other bursts in the channel and to detect errors in the data received from other stations.

One of the stations in the system is designated as the Reference Station, and transmits one burst per frame in addition to its normal burst. The additional burst contains a uniquely identifiable sync word which is used by all stations to denote start-of-frame.

The CSC frame length is 50 msec. The burst length is 1 msec., allowing fifty accesses per frame. Since two accesses are used each frame by the reference station, a maximum of 49 stations may access the channel. The channel operates at a bit rate of 128 kbps. The duration of each access, including guard time, is 1 msec. The burst make-up is as follows:

| | Reference Station | Local Station |
|---|---|---|
| Carrier Recovery | 49 | 16 |
| Bit Timing Recovery | 40 | 19 |
| Synchronization Word | 32 | 20 |
| Data | | 48 |
| Parity | | 18 |
| Carrier Hangover Time | 2 | 2 |
| Guard Time | 5 | 5 |
| | 128 bits/access | 128 bits/access |

The reference station transmits its bursts at a time determined only by its clock. It does not use burst synchronization. Any station in the FDMA network may serve as the reference station. The station so designated transmits two bursts every frame, one of which is uniquely identifiable by all other stations as the start-of-frame burst. This burst contains no data.

The second burst is the data burst which has a make-up identical to the data bursts from all other stations.

The reference station receives data in a manner identical to that of all other stations in the network. All received data is sent directly to DASS.

In the event that the reference station should be unable to function normally, the station selected as first alternate (by prior agreement) takes over the reference station function automatically. Detection of failure of the reference station and takeover of the function by first alternate is under the control of DASS. Failure is assumed to have occurred when three frames in succession are received in which the reference burst is absent but in which bursts from other active stations are still present. It is assumed that presence or absence of a station is determined by the presence or absence of the sync word detection.

The local station receives bursts from the reference station and all other local stations. However, the time of transmission of its own burst is synchronized to the time of receipt of the reference station sync word, so that the bursts from all stations arrive at the satellite in the proper order and separated from one another by the correct amount of guard time.

Figure 3A:
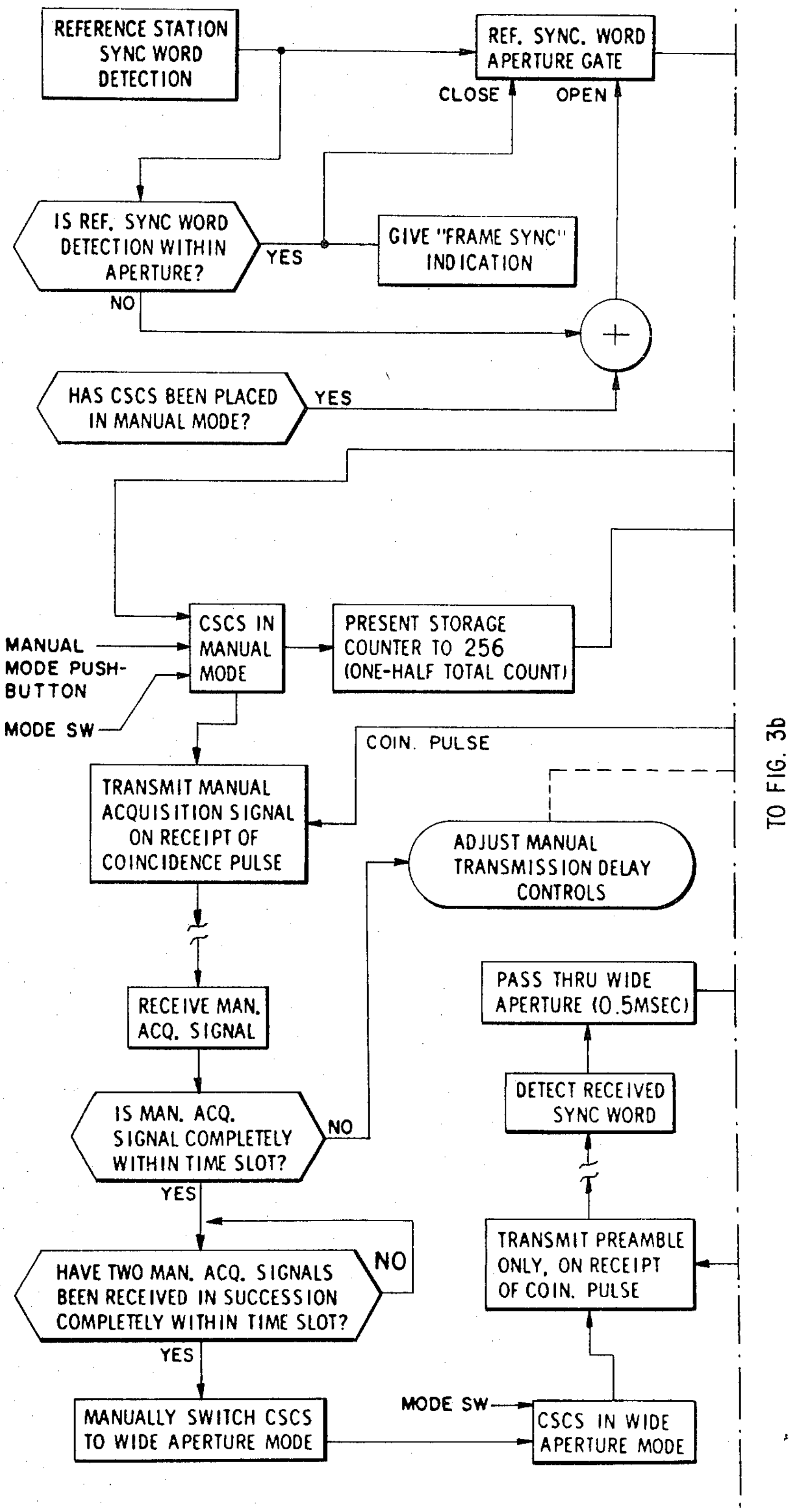
FIGS. 3*a* through 3*c*, taken together, form an operational flow diagram of the common signaling channel synchronizer.
Figure 3B:
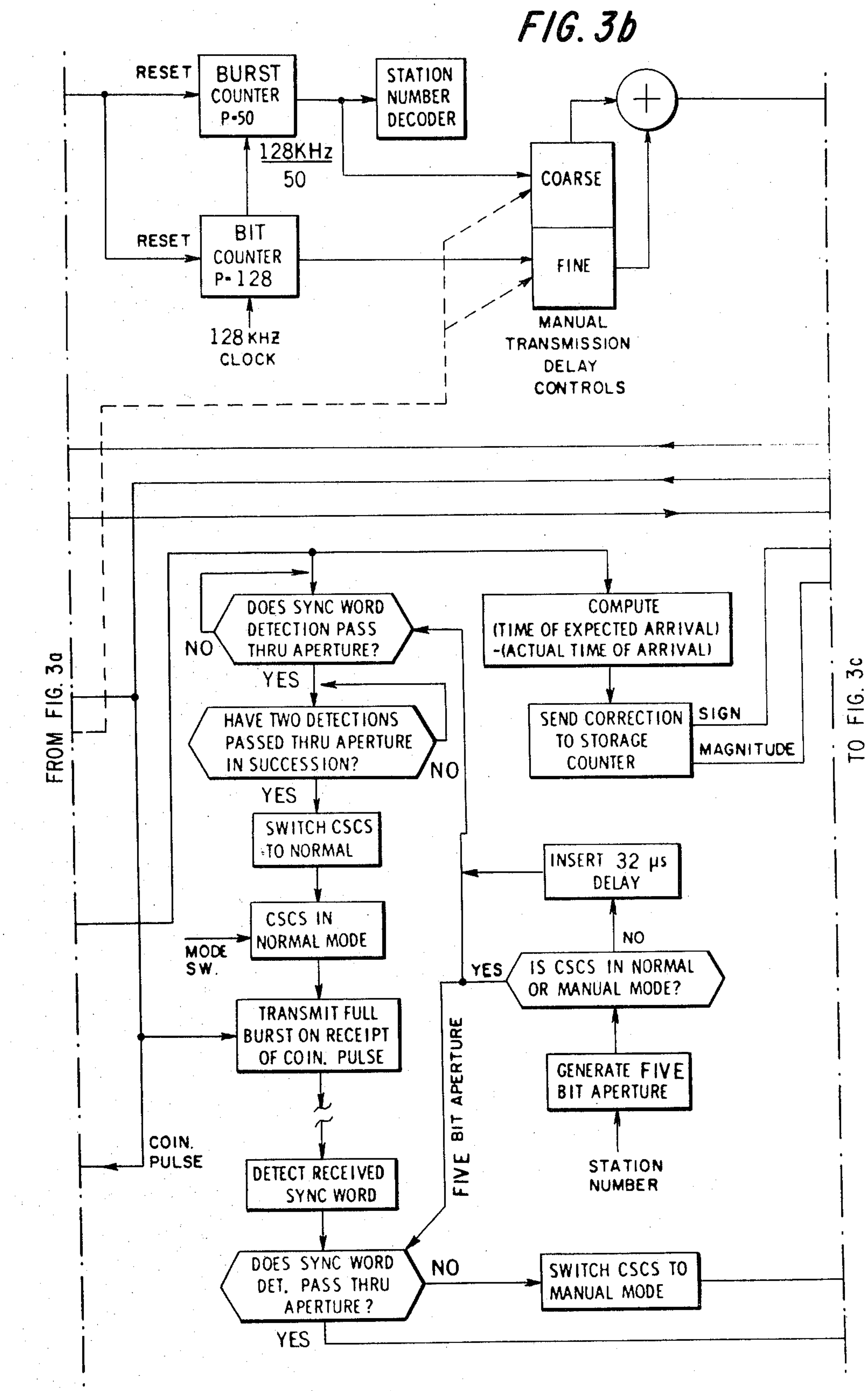
Figure 3C:
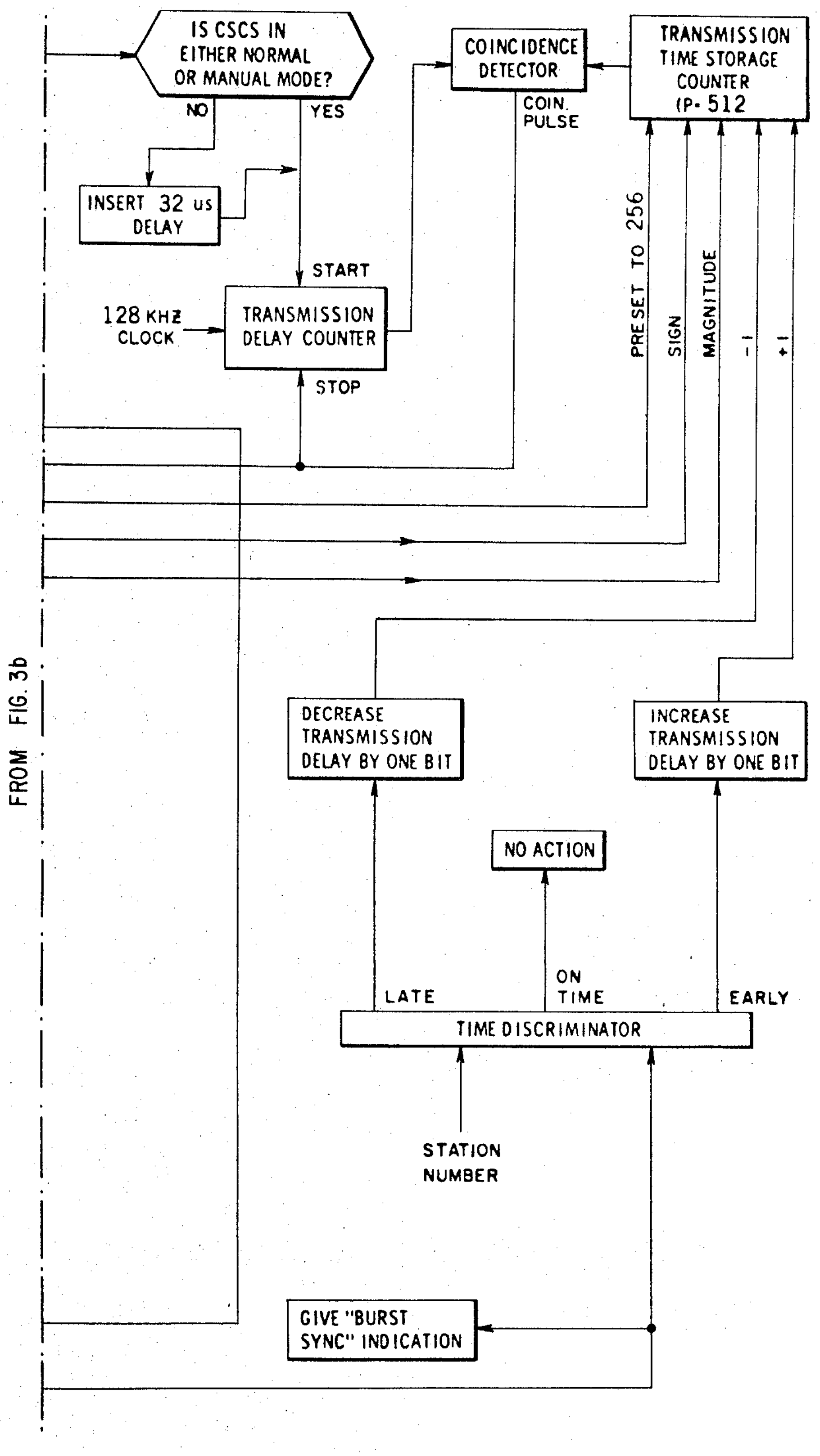

In order to clearly describe the burst synchronization operation, each functional unit involved in this operation will be described first, followed by a description of the sequential actions which take place during synchronization. (See FIG. 3*a* through 3*c*)

Figure 4:
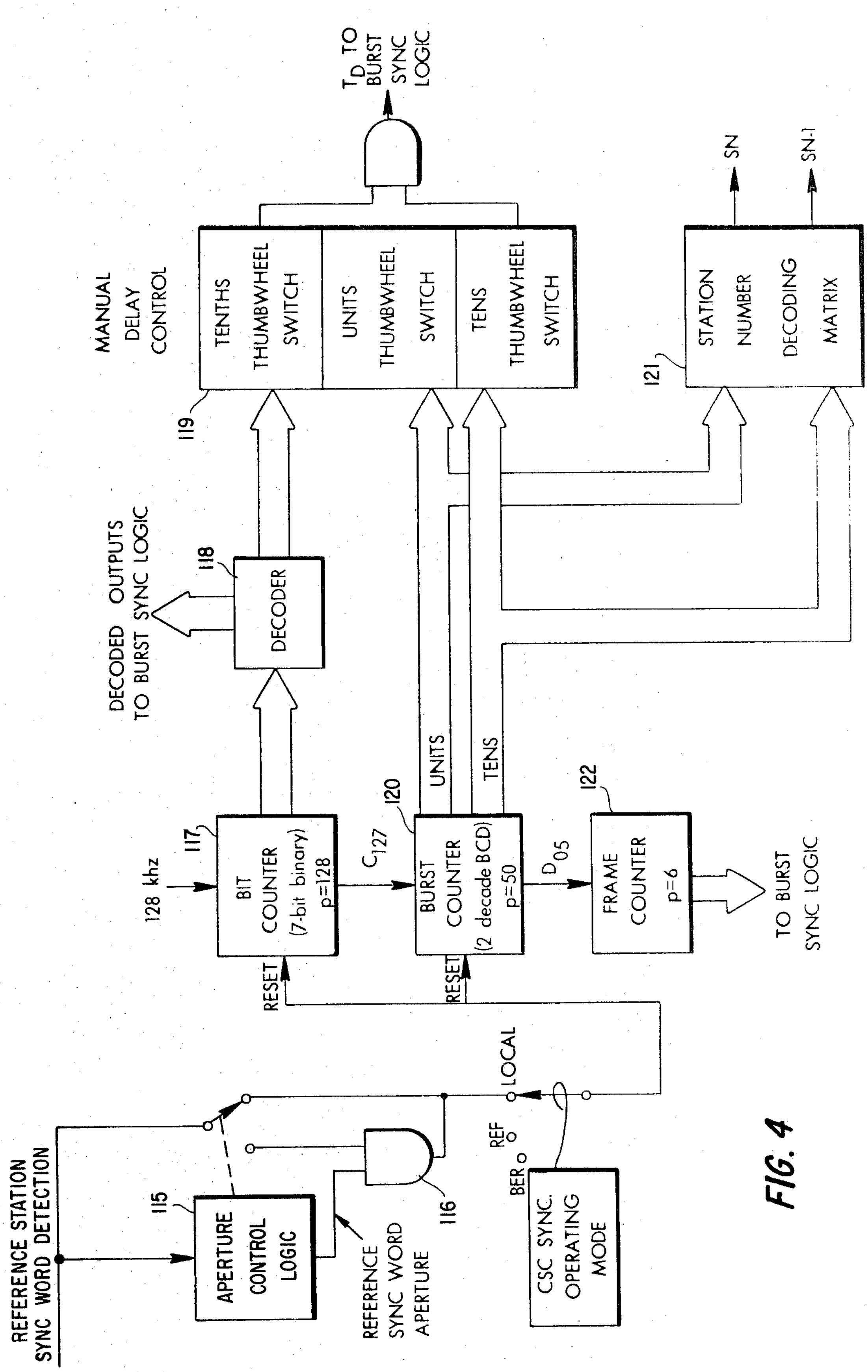
FIG. 4 is a block diagram of the common signaling channel time base.

Referring to FIG. 4 the aperture control logic 115 determines when the reference station sync word is being received within the proper time tolerance. When this tolerance has been achieved, a three-bit aperture is applied to the detection gate 116 to reduce the probability of false detection. At the same time, a light indication of "Frame Synchronization" is given.

The bit counter 117 is reset by the reference sync word detection, and counts the 128 kHz clock. Its decoded outputs from decoder 118 go to the burst sync logic and to one of the manual delay controls 119.

The burst counter (BCD) 120 is also reset by the reference sync word detection. It is clocked by the 1 kHz output from the bit counter. Its outputs go to the manual delay controls 119 and to the station number decoding matrix 121.

The frame counter 122 is clocked by the output of the burst counter and is used to determine the interval between burst sync measurements.

The manual delay controls 119 produce a single output pulse anywhere in the frame. Its position is determined by the setting of the controls. The timing of the pulse determines, in part, the time of transmission of the burst.

The early and late gate generators 123 (FIG. 5) are driven by the outputs from the bit counter 117 and from the station number decoding matrix 121. The early gate opens 250 μsec. prior to the correct time of reception of a station's sync word and closes one-half bit prior to the correct time of reception. The late gate opens one-half bit after correct time of reception and closes 250 μsec. later. In the "Wide Aperture" mode, the correct time of reception is shifted later in time by 32 bits from its normal value. For this reason, there are separate early and late gates for the "Wide Aperture" and the "Normal" modes. The five-bit aperture is used to gate the local station's sync word to reduce the probability of false detection.

The sync loss circuitry 124 determines when the station has lost sync, having once acquired it, stops transmission of the station's burst, and puts the CSC Synchronizer in the manual mode.

The Time Comparator 125 compares the actual time of reception of the station's sync word with the correct time, determines sign and magnitude of the difference, and corrects the time of transmission accordingly. This comparator is active only in the Wide Aperture mode.

The Bidirectional Storage Counter 126 stores a number of bits which represent the time quantity which must be added to the pulse from the manual delay controls 119 in order to arrive at the correct time of transmission.

The Vernier Transmission Delay Counter 127 inserts this incremental time quantity. It is started by the output from the manual delay control 119 and stopped when its count equals the count in the Bidirectional Storage Counter 126.

The magnitude Comparator 128 determines when the contents of the two counters are equal.

The 32-Bit Delay 129 is inserted in the Wide Aperture mode to delay the start of transmission by 32 bits (250 $\mu$sec). This is done to position the shortened burst (430 $\mu$sec) approximately in the center of its time slot in order to increase the allowable margin for error in positioning the burst during the manual mode.

The coincidence output from the burst synchronizer goes to the transmit section of the CSCS where it initiates transmission of the burst.

To begin discussion of the burst synchronization process, assume that the station under consideration is completely unsynchronized. In this condition, the bit, burst, and frame counters are not running, and are each held at a count of zero. (Refer to FIG. 3.)

Referring to FIG. 4, the reference Sync word detection is simultaneously applied to the reference aperture control logic 115 and, via the switches shown, to the reset inputs of the bit and burst counters 117 and 120. The bit counter 117 now begins counting the 128 KHz clock, and every 128 counts it simultaneously resets itself and advances the burst counter 120 by one. Since these counters have been reset by the reception of the reference sync word, each state of the bit counter 117 will correspond to a particular bit in any received burst. Each state of the burst counter 120 will correspond to a particular received burst. When the content of the burst counter 120 reaches the value programmed into the Station Number Decoding Matrix 121, the output of the matrix 121 will "go true." When the combined contents of the bit and burst counters 117 and 120 equal the number set into the manual delay control 119, an output will be produced ($T_d$) and set to the burst sync logic.

Figure 5:
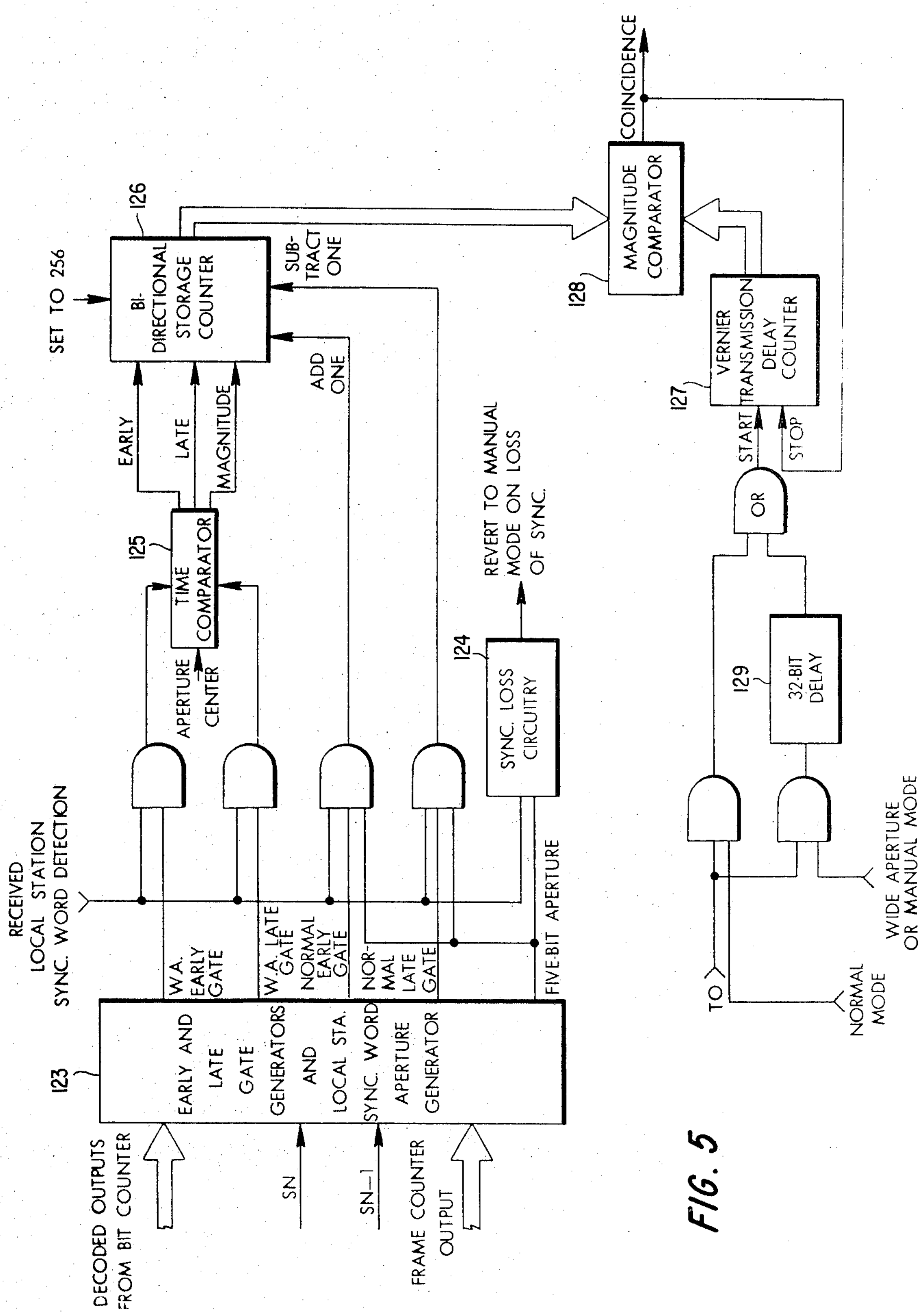
FIG. 5 is a block diagram of the burst synchronizer of the common signaling channel synchronizer.

Since the assumption is that the station is completely unsynchronized, the CSC Synchronizer will be in the Manual mode, so that the $T_d$ pulse will start the 32-bit delay 129 shown in FIG. 5. At the expiration of this delay, the Vernier Transmission Delay Counter 127 will be started. In the Manual mode, the Bidirectional Storage Counter 126 is set to a count of 256, so when the Vernier Counter 127 reaches this count, the Magnitude Comparator 128 will detect a coincidence, stopping the Vernier counter 127 and initiating a transmission. Since the CSCS is in the manual mode, the transmission will consist of a 1 msec burst of pure carrier.

The next reference sync word is checked by the aperture control logic 115. If it passes through the aperture, it advances a counter by one. At the same time, it resets the bit and burst counters 117 and 120, and the sequence above is repeated.

On reception of the next reference sync word, if it passes through the aperture, the burst synchronizer is assumed to be in frame sync, and the "Frame Sync" indicator is illuminated. This indicator will stay lit unless two detections in succession are missed or fail to pass through the aperture. Should this happen, the CSCS is placed in the manual mode.

Approximately 280 msec. after the burst transmission has been initiated, it will be received by the originating station. At this point, the operator uses a display function to determine the position of the received burst. Assuming that the burst position is not exactly correct, the operator then adjusts the manual delay control 119 to position the burst correctly. Adjusting this control varies the number of bits following the reception of the reference sync word at which a transmission is initiated. Once the operator has achieved the allowable time tolerance (± 250 sec.), he then presses a button which puts the CSC in Wide Aperture mode. At this point, the direct set is removed from the bidirectional storage counter 126, the transmission changes from the 1 msec. burst of unmodulated carrier to the preamble portion of the normal burst. The reset is also removed from the Frame counter 122, which is now allowed to advance with inputs from the burst counter 120. The frame counter 122 is used to insure that the burst sync can be checked no more often than once every six frames (once every 300 msec). This is done to allow for the round-trip delay.

The next coincidence pulse following the transition to the Wide Aperture mode will cause the preamble to be transmitted. Approximately 280 msec later, it will be received. At this point, the output from the frame counter 122 will be "true" allowing a comparison to be made of the time difference between the actual and expected time of reception of the sync word. The sign and magnitude of this error are then applied to a storage counter. When the $T_d$ output from the manual delay control 119 "goes true," it will start the 32-bit delay 129 which will run and in turn start the Vernier Transmission Delay Counter 127. When the contents of this counter equal that of the storage counter, a coincidence pulse will again be produced, stopping the Vernier counter 127 and keying off another transmission. This time, however, the transmission should be received at precisely the correct time, ± 2 bits. When two successive bursts have been received within this tolerance, the CSCS switches to the Normal mode automatically. At the same time, the Frame counter 122 is again reset, the transmission changes from preamble only to the full burst with data, and the "Burst Sync" indicator is illuminated.

At a time 280 msec following this transition, the CSCS receives the first full data burst. From this point on, only a ± 2 bit error is allowed in received burst timing. If this error is exceeded twice in succession, or if the sync word detection is missing twice in succession, the CSCS is automatically placed in the manual mode and the "Burst Sync" indicator is extinguished.

Figure 6:
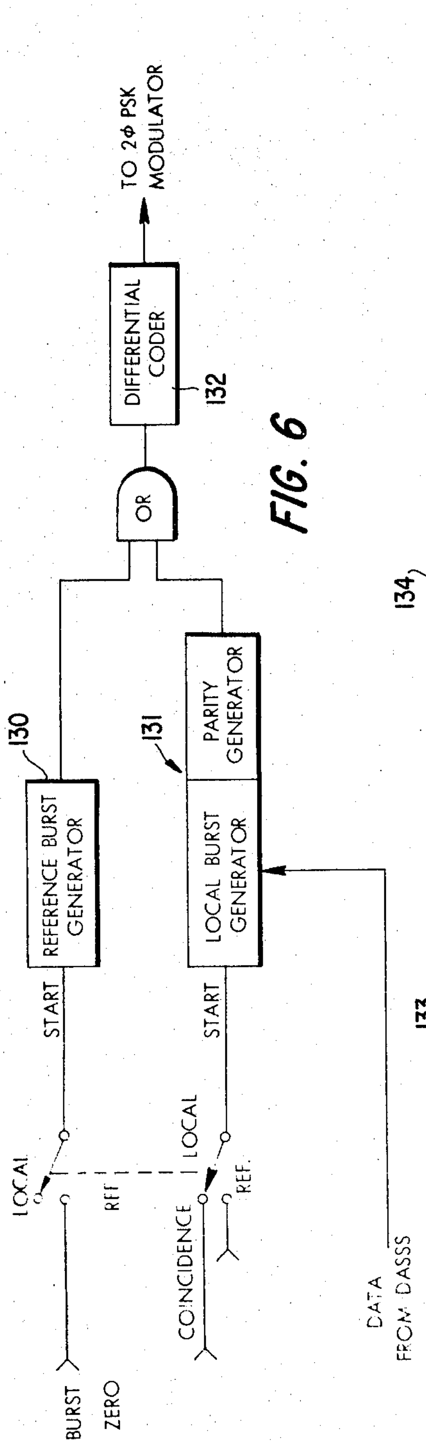
FIG. 6 is a block diagram of the common signaling channel transmit unit.

The transmit unit (See FIG. 6) receives a start pulse from either the burst synchronizer (in the local station mode) or the burst counter (in the reference station mode).

In the reference station mode, the bit and burst counters 117 and 120 are free-running. When the contents of both the bit and burst counters equal zero, the reference burst generator 130 is keyed on and produces the reference burst sequence. In the same mode, when the output from the station number matrix 121 "goes true," the data burst generator 131 is keyed on.

In the local station mode, the coincidence pulse keys on the data burst generator 131.

In either mode, the output of the transmit unit is a differentiallycoded bit stream from coder 132 which is sent to the two-phase PSK modulator.

Figure 7:
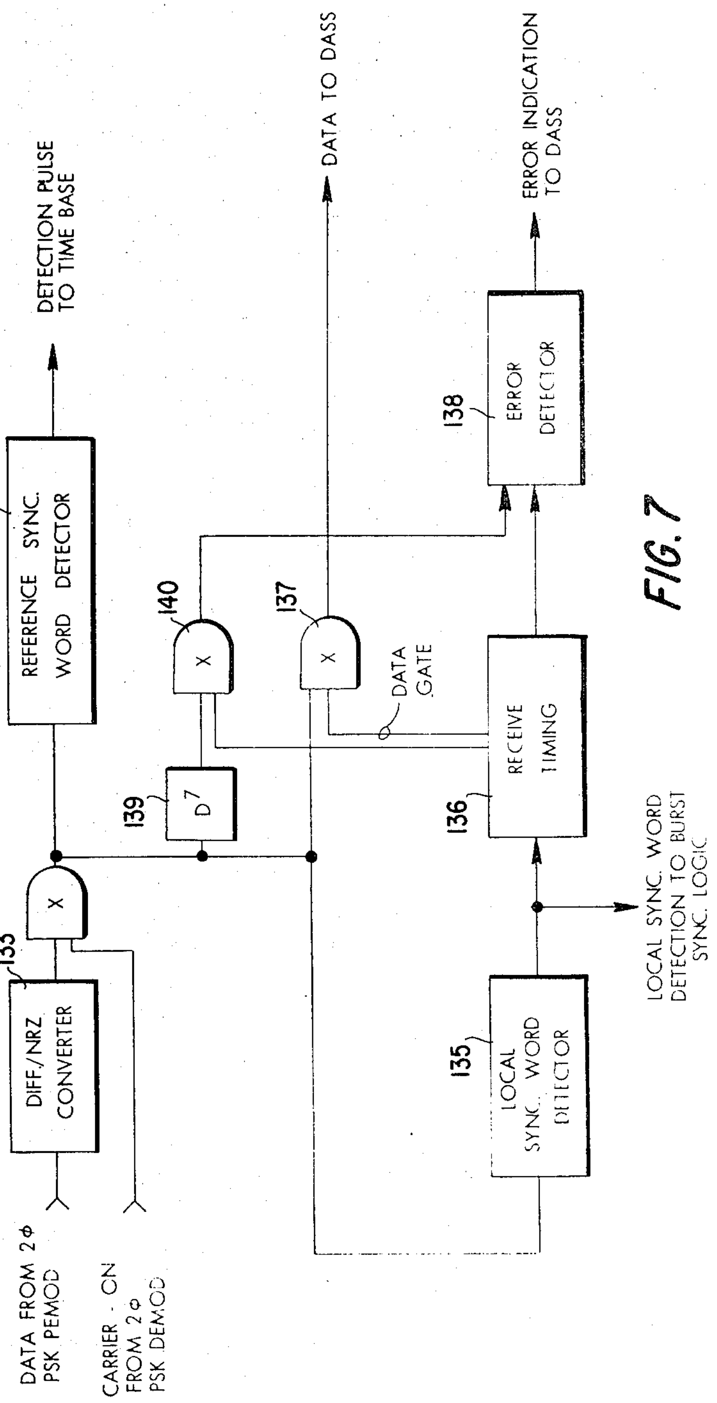
FIG. 7 is a block diagram of the common signaling channel synchronizer receive unit.

Referring to FIG. 7 the output of the PSK demod is converted from differential coding to NRZ format by converter 133 upon entering the receive unit. This signal is immediately applied to the two analog sync word detectors 134 and 135 which provide inputs to the time base and the burst sync logic. In the case of a data burst, its reception starts a counter 136 in the receive timing unit which controls the data gate 137 and the error detector 138. The data gate opens on detection of the sync word to allow data to be fed to DASS. The data stream is also delayed by 7 bits by seven-stage shift register 139 and gated by gate 140 into the error detector 138.

The purpose of the delay is as follows: the data block is 48 bits long; however, there is no BCH code which will encode exactly 48 bits. The shortest code which will work is one which encodes 55 bits, or 7 more than the data block. By encoding the last 7 bits of the unique word together with the 48 bits of the data block, the code constraint is met. In the receiver, the sync word detection is always made on the last bit of the unique word. It is this detection which opens the data gate. By delaying the data stream by 7 bits into the error detector 138, then, we are ensuring that when the data gate opens, the first bit into the error detector will be the same one as entered the parity generator first on the transmit side. Thus the same bits are encoded and the regenerated parity may be checked, bit for bit with the received parity.

Data passed via the CSC is encoded to provide detection of errors. Up to four errors in the block of 55 data bits can be detected by the approach used.

The method used is to feed the 48 data bits plus the last seven bits of the sync word into an 18-bit shift register with properly-connected feedback paths. At the end of the 55 bit sequence, the feedback is disconnected and the contents of the register are shifted out and transmitted with the data. These 18 check bits will now bear a unique relation to the particular data sequence used to generate them. At the receiver, the identical operation is performed and the regenerated parity is compared bit-for-bit with the received parity. If the two match, no error has been made in transmission. If there is a mismatch, indicating an error, a pulse is produced which provides an error indication to DASS.

Figure 8:
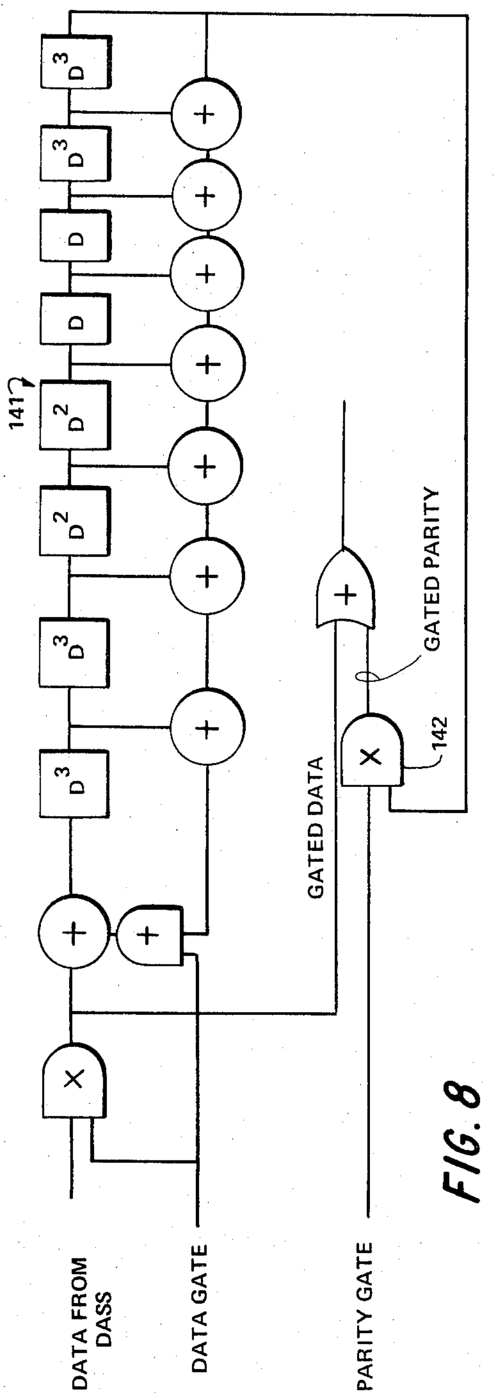
FIG. 8 is a block diagram of the common signaling channel synchronizer BCH parity generator.
Figure 8A:
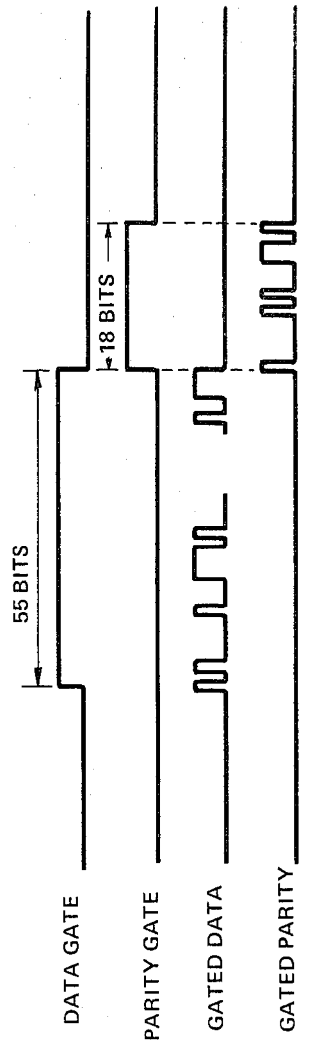
FIG. 8*a* is a timing diagram of the parity generator shown in FIG. 8.

The block diagram of the BCH Parity Generator is shown in FIG. 8. The input data consists of the last seven bits of the sync word plus the 48 data bits. These are gated into the parity generator by the data gate and clocked into the shift register 141 by the 128 KHz clock. The shift register has seven taps which are added modulo-2 with the output to provide the feedback function. At the end of the 55 bit sequence, the data gate closes and the parity gate 142 opens, allowing the 128 KHz clock to shift out the contents of the register. The parity gate 142 remains open for the duration of the 18 check bits. It should be stressed that the positions of the shift register taps are critical. FIG. 8*a* shows the timing relationships in the parity generator.

Figure 9:
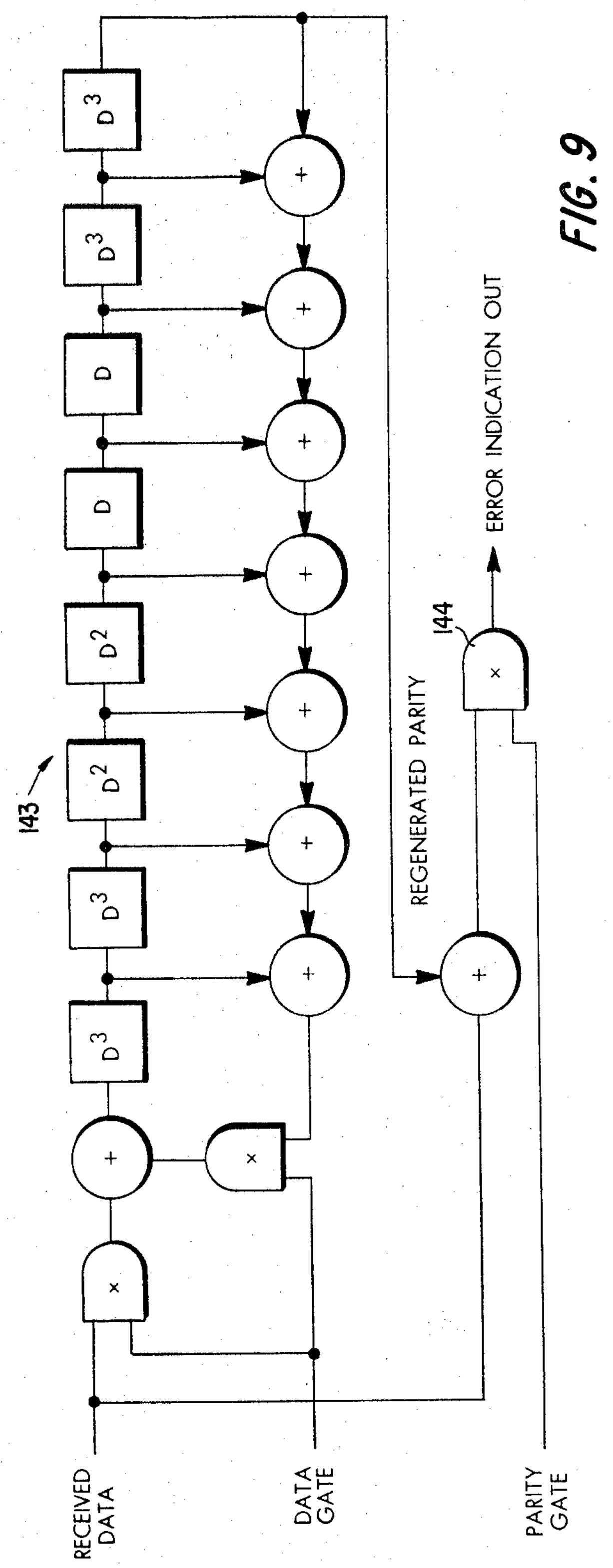
FIG. 9 is a block diagram of the common signaling channel BCH error detector.
Figure 9A:
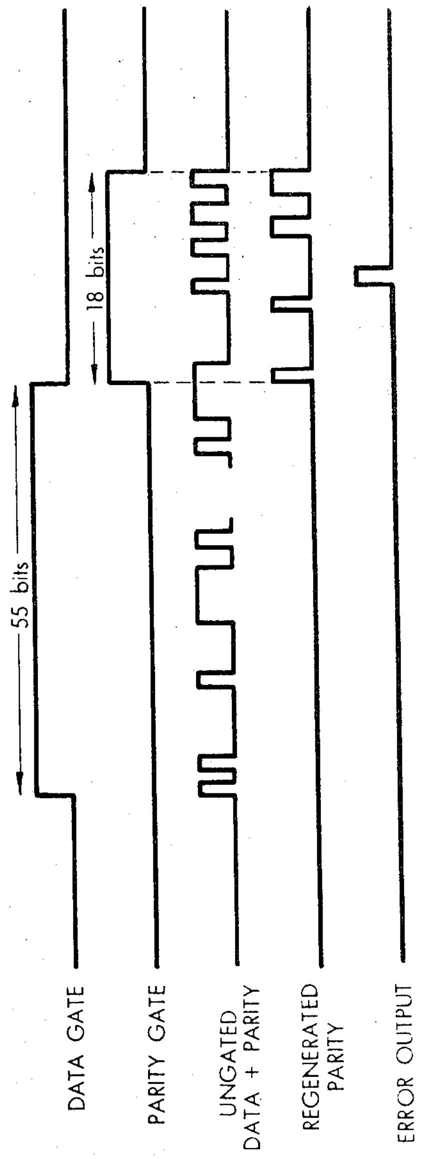
FIG. 9a is a timing diagram of the error detector shown in FIG. 9.

The block diagram of this unit is shown in FIG. 9. The "received data" includes the last 7 bits of the unique word as well as the 48 data bits. This 55-bit group is gated into the register 143 by the data gate and clocked in by the 128 KHz clock derived from the received data by the PSK demodulator. At the end of the data block, the data gate closes and the parity gate 144 opens, allowing a bit-for-bit comparison between received and regenerated parity. Any disagreement between the two will show up as a pulse which is sent to DASS. FIG. 9*a* shows the timing relationships in the error detector.

Figure 10:
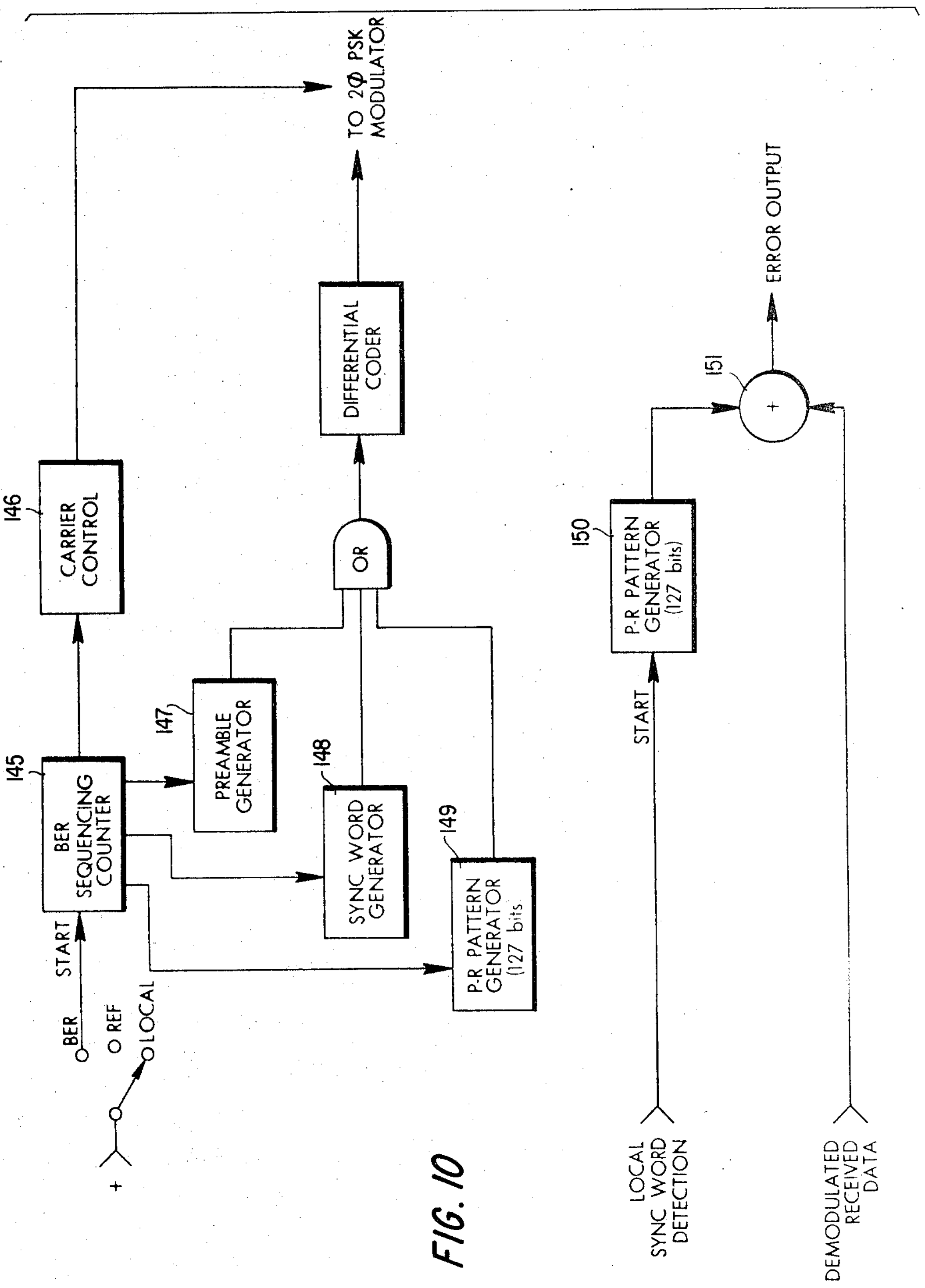
FIG. 10 is a block diagram of the common signaling channel bit error rate measurement logic.

The Bit Error Rate (BER) measurement logic is shown in FIG. 10. This circuitry is included in order to allow easy testing of the PSK modem associated with the CSCS. The general method of approach is to transmit a pseudo-random sequence, regenerate an identical sequence at the receiver in synchronism, and make a bit-for-bit comparison between the two. Referring to FIG. 10, when the CSCS is placed in the BER mode, the BER sequencing counter 145 is started. This generates gating functions which control the time of transmission of the various segments. The first segment to be transmitted is the carrier recovery block form carrier control 146 which is 16 bits of unmodulated carrier. The second segment is the bit timing recovery block from preamble generator 147, which is 19 bits of 1010 . . . The third segment is the local station sync word of 20 bits from sync word generator 148. The fourth segment is a 127-bit *m*-sequence from pattern generator 149. Following this, the third and fourth segments are repeated continuously until another operating mode is selected. At the receiver, reception of the sync word starts the generation of the 127-bit sequence identical to the one transmitted by pattern generator 150. The received and regenerated sequences are then compared bit for bit in a modulo-2 adder 151; the error output is then made available to an external counter.

A two phase PSK Modem is used for the CSC. The CSC carrier is located just below the lower edge of the band and overlaps into the first two channel slots. Differential encoding is used on the data stream so that no ambiguity resolution needs to be provided.

Figure 11:
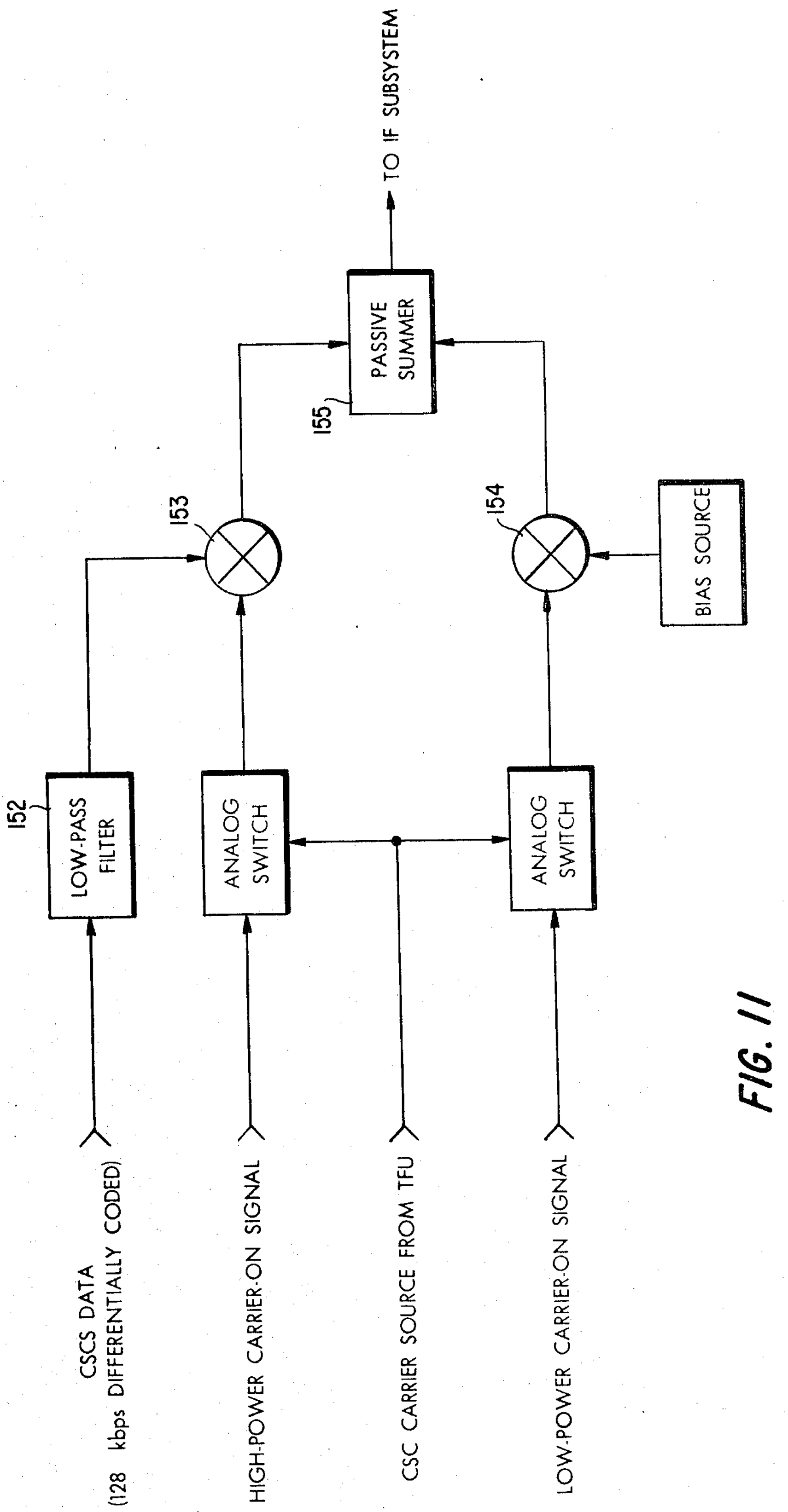
FIG. 11 is a block diagram of the common signaling channel PSK modulator.

The modulator for the CSC is quite conventional. Refer to FIG. 11. The input data stream is low pass filtered by filter 152 and fed to one part of a balanced mixer 153. The other part of this mixer 153 accepts the carrier frequency from the CSC Carrier Oscillator in the TFU. The outputs of the two mixers 153 and 154 are gated by signals from the CSC synchronizer permitting transmission of the carrier at either high or low power, depending on the mode. The gated output goes through a passive summer 155 and is then translated to the station IF along with the voice channels.

The operational functions to be performed by the Signaling and Switching Processor (SSP) are all logical in nature and are highly repetitive; therefore, the SSP is implemented using a small stored program processor.

The Signaling and Switching Processor (SSP) has the following capabilities:

a. A total of 8192 words of random access memory having a minimum of 16 bits per word.

b. A direct memory access channel having a worst case access of 4 microseconds.

c. A program protect capability which will inhibit the memory write operation in any one or more of sixteen memory sections containing 1024 words each. Any one or more of the sixteen 1024 word memory sections shall be selectable by the operator.

d. A memory read-write full period cycle time of 1.0 microsecond or less for each 16 bits.

e. An average load and store instruction time of 2.0 microseconds or less.

f. An arithmetic instruction time which shall require 2.0 microseconds or less for ADD, SUBTRACT and MEMORY INCREMENT. A single precision Multiply and Divide time of 18 microseconds or less to execute.

g. Logical instructions including "AND," "OR," and "EXCLUSIVE OR," which shall require 2.0 microseconds or less to execute.

h. Jump instructions including, JUMP UNCONDITIONALLY, JUMP IF ACCUMULATOR POSITIVE, JUMP IF ACCUMULATOR ZERO, JUMP IF ACCUMULATOR NEGATIVE, JUMP ON OVERFLOW and which shall require no more than 2.0 microseconds to execute plus a JUMP and STORE PROGRAM LOCATION which shall require no more than 3.0 microseconds to execute.

i. Input and Output instructions including the 16 bit parallel data transfer directly between the external device and memory as well as external control of the input output devices which shall require no more than 2.0 microseconds to execute.

j. A power-fail and program restart capability to assure that all connected calls and all calls in the process of being connected or disconnected are continued upon restoration of power.

k. A relative-time clock having a minimum time resolution of 10 milliseconds or less.

l. An input-output device addressing capacity for at least eight independent external devices.

m. An eight level code teletypewriter terminal using an odd parity check to provide an input-output interface to the maintenance supervisor.

Other capabilities and options are acceptable provided that the operation does not increase the loop time of the operational programs to exceed 1 millisecond.

The SSP interfaces with the following equipments:

Channel Units
Common Signaling Channel Unit
Terrestrial Interface Unit
Supervising and Maintenance Unit
Signalling Terminal (Option For Common Channel Signaling)

Figure 12:
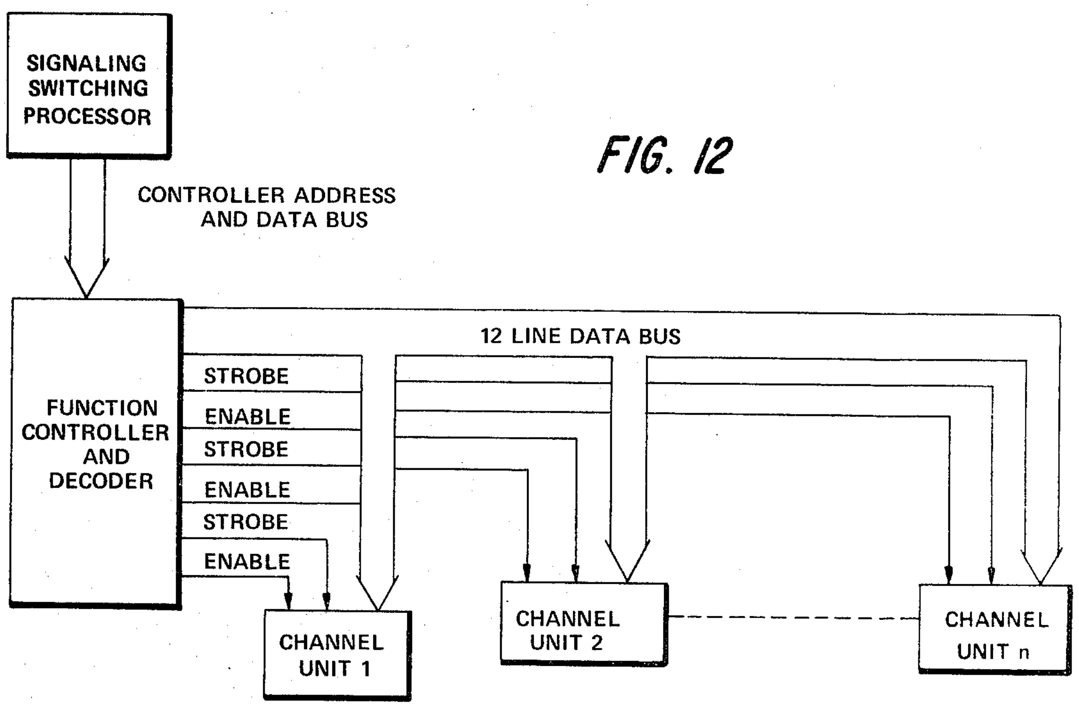
FIG. 12 is a functional block diagram of the demand assigned switching and signaling processor and channel unit interface.

An independent input-output controller and channel identification decoder is required to enable-disable and select the frequency of each channel unit. A common 12 line data bus (three BCD characters) is linked to the frequency synthesizer of each channel unit along with a separate decoded data strobe line and an enable/disable line for each channel unit. A functional block diagram of this interface is shown in FIG. 12.

The Common Signaling Channel interface is of two types. One includes a direct memory access controller, an input register and an output register. The second interface to the CSC includes a device decoder and two bits for external control. This interface is used to control the operating mode of the CSC.

Figure 13:
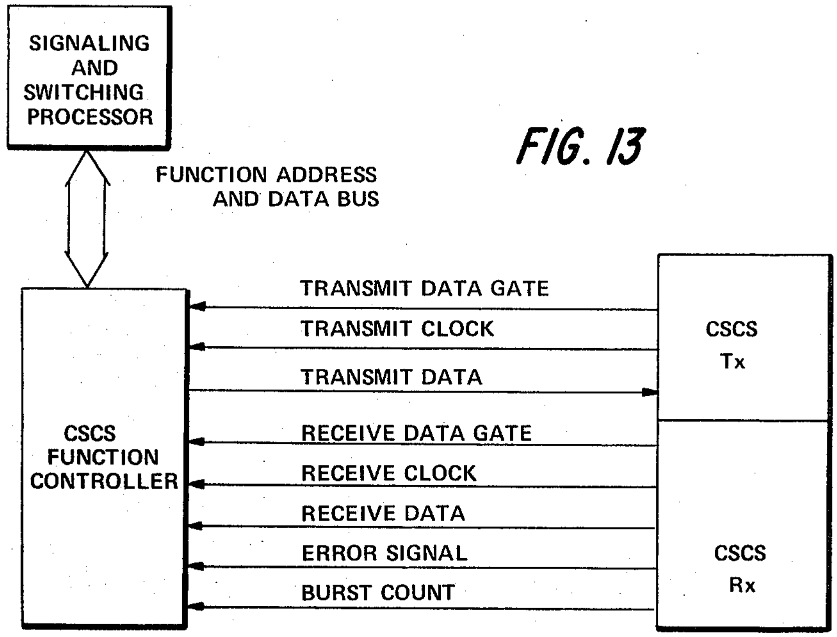
FIG. 13 is a functional block diagram of the demand assigned switching and signaling processor and common signaling channel synchronizer interface.
Figure 14:
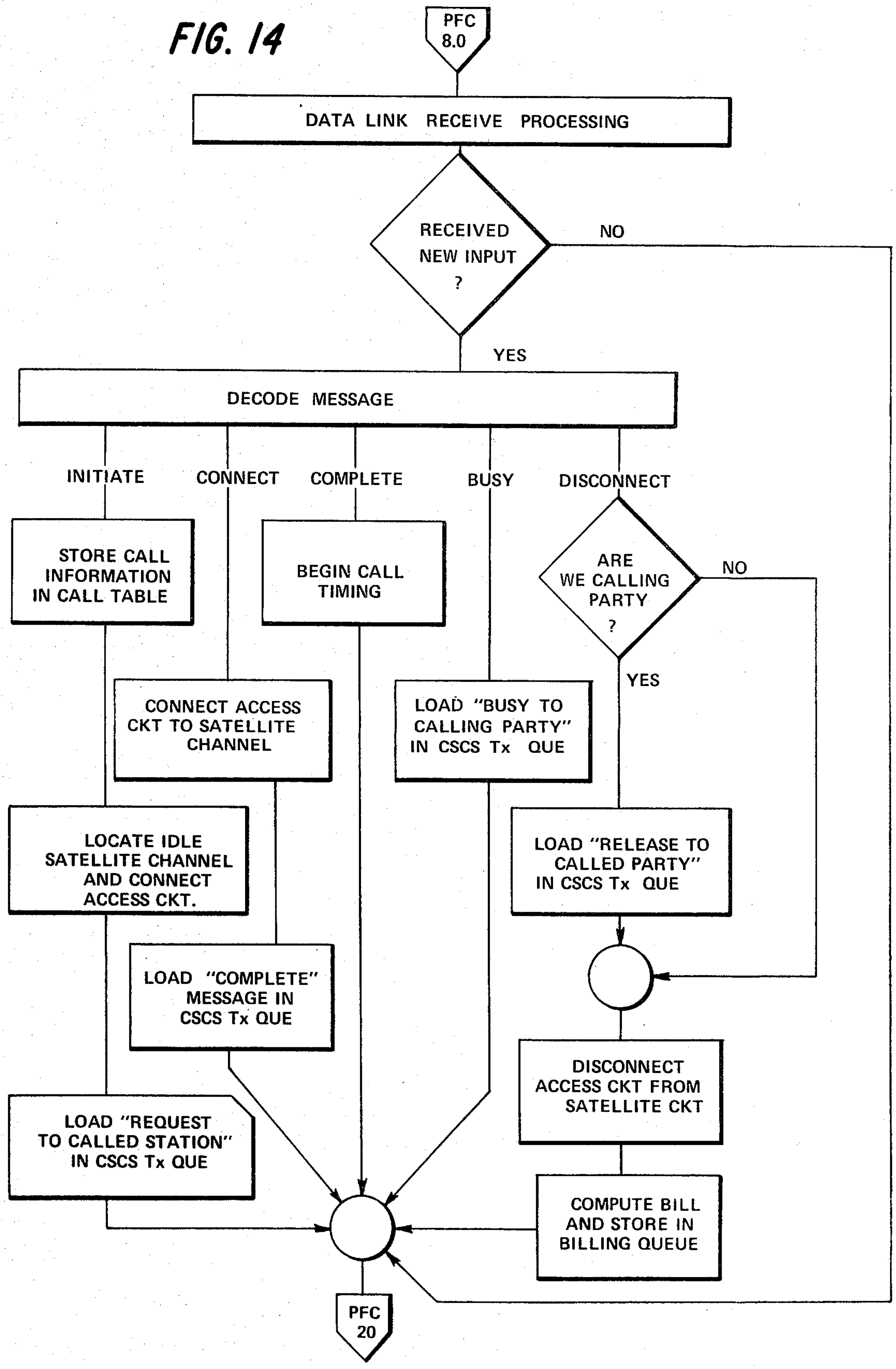
FIGS. 14 to 24 are flow diagrams of the demand assigned switching and signaling processor routines.
Figure 16:
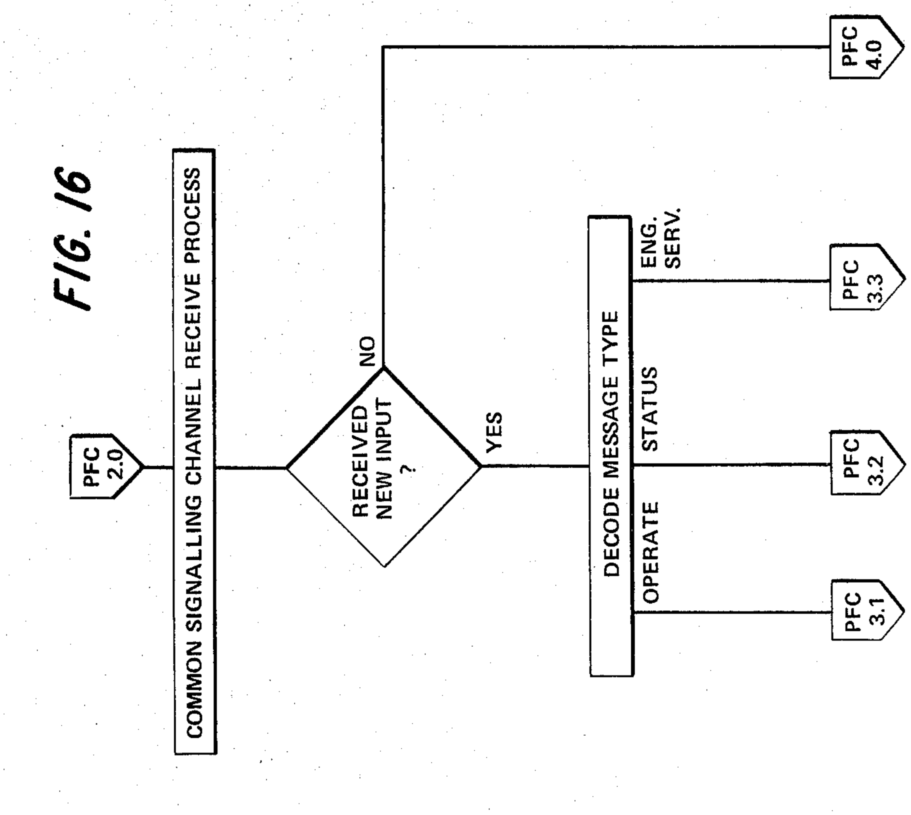
Figure 15:
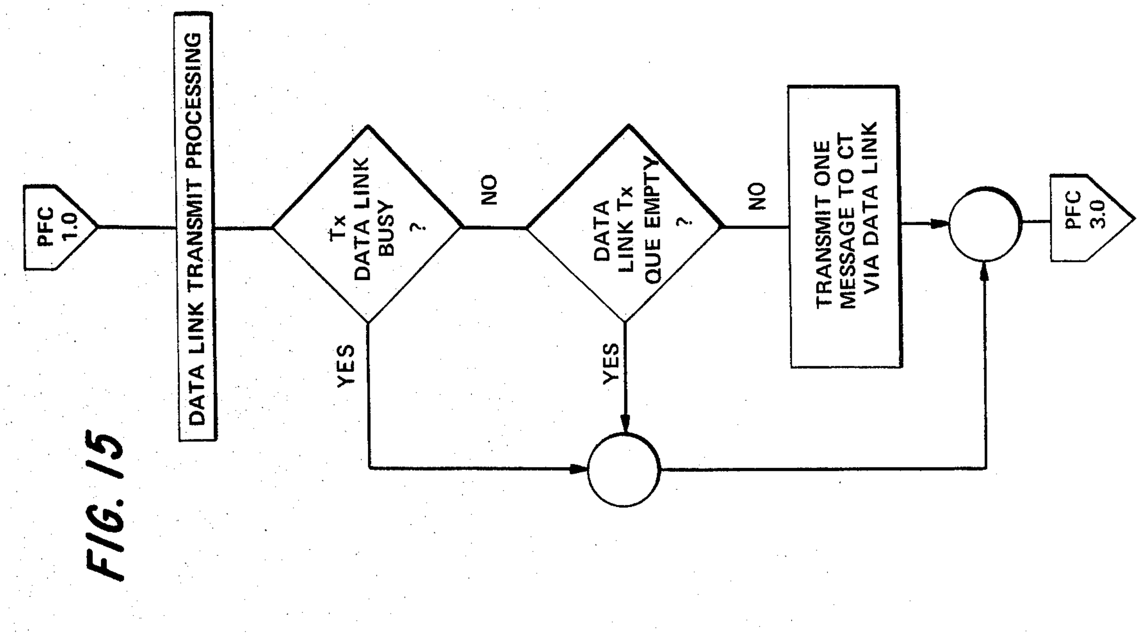
Figure 17:
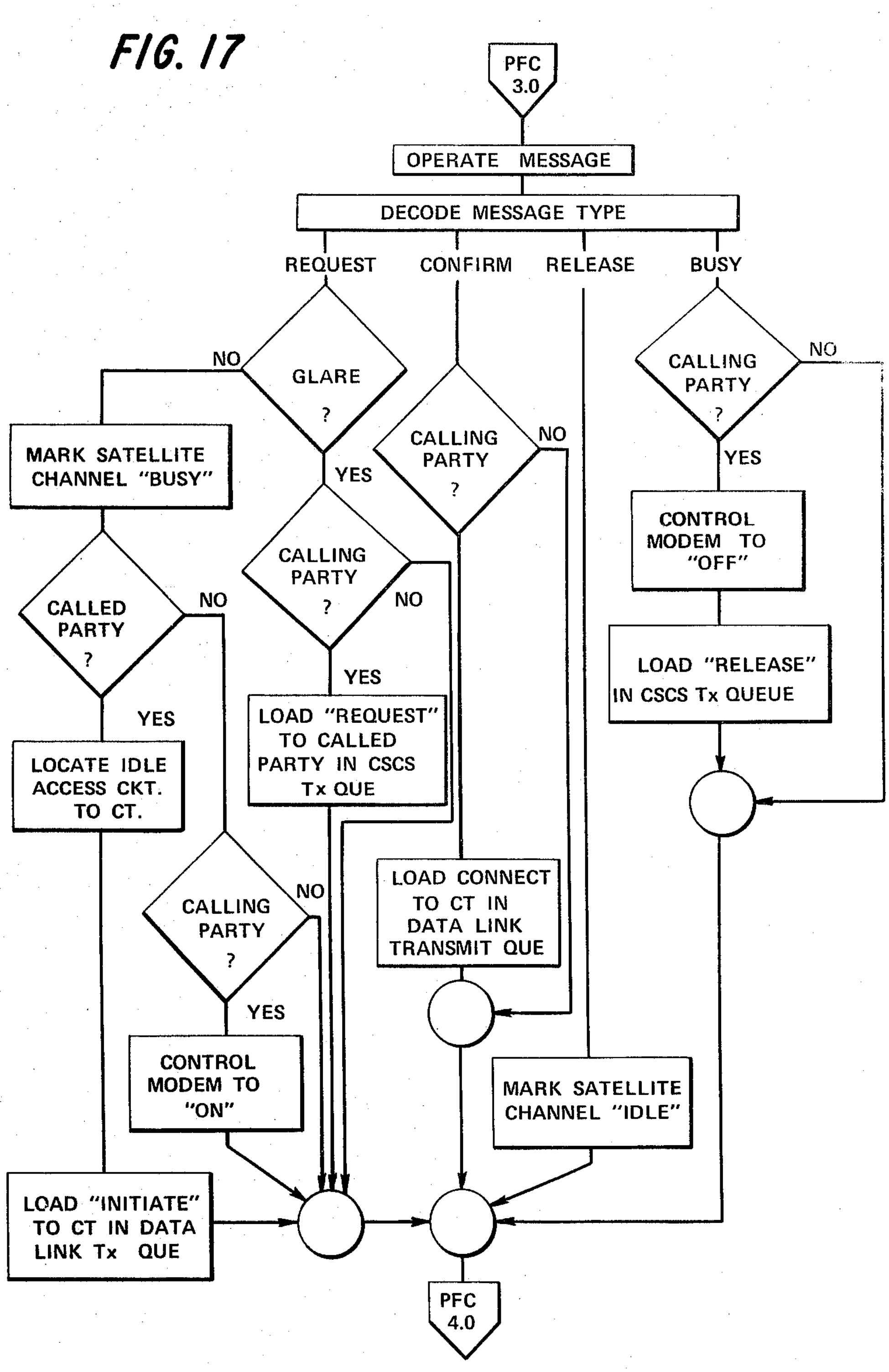
Figure 19:
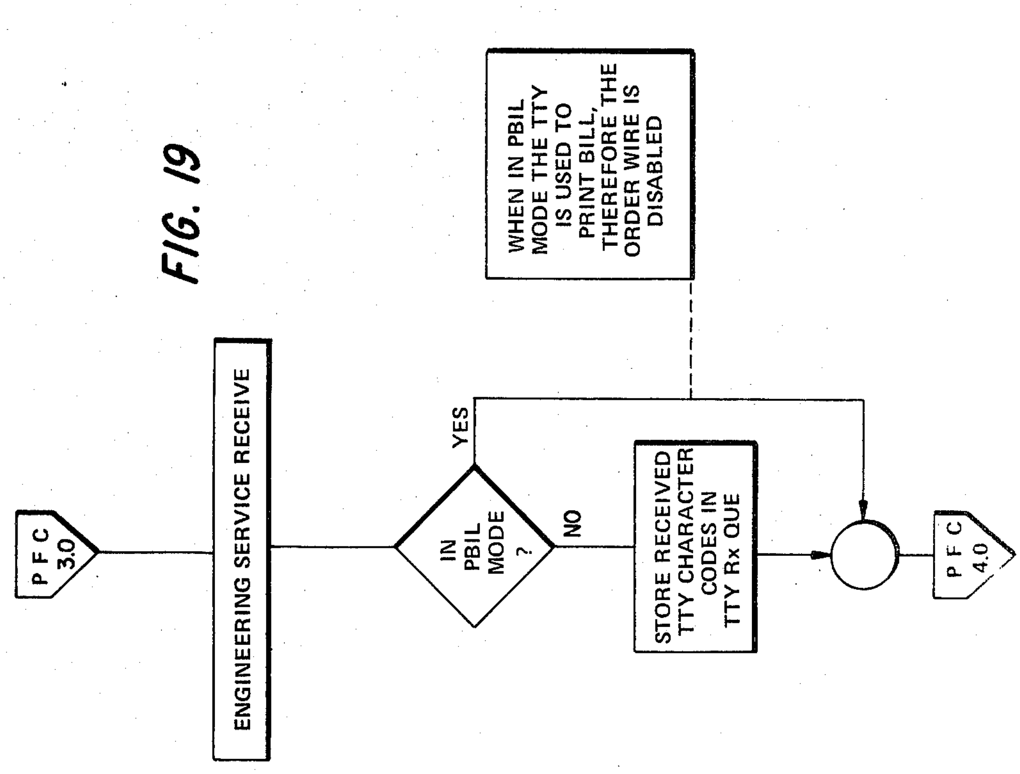
Figure 18:
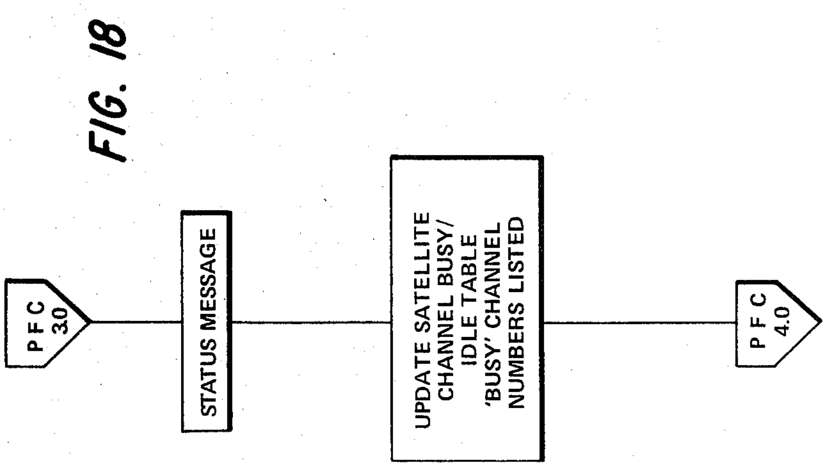
Figure 20:
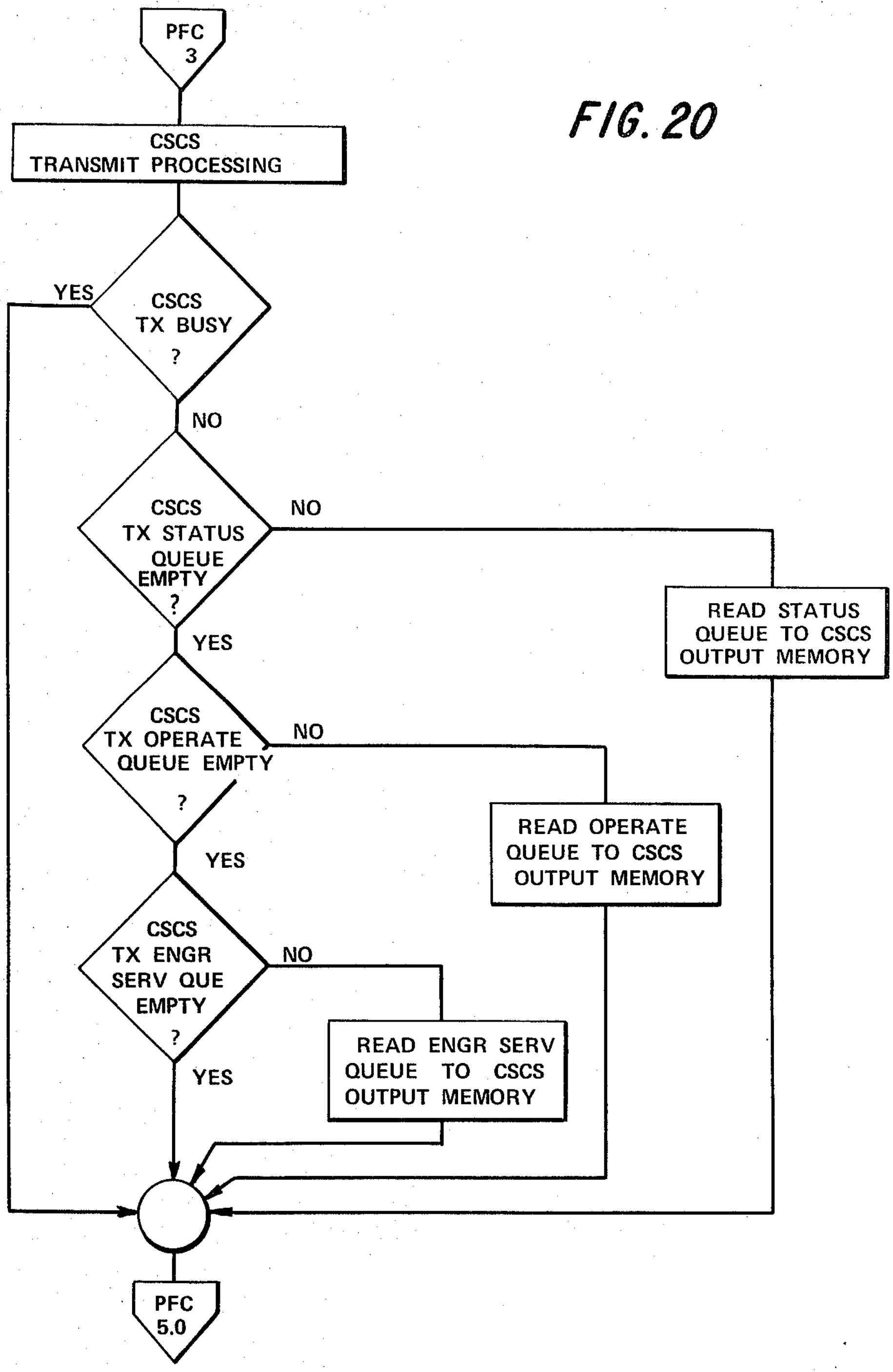
Figure 21:
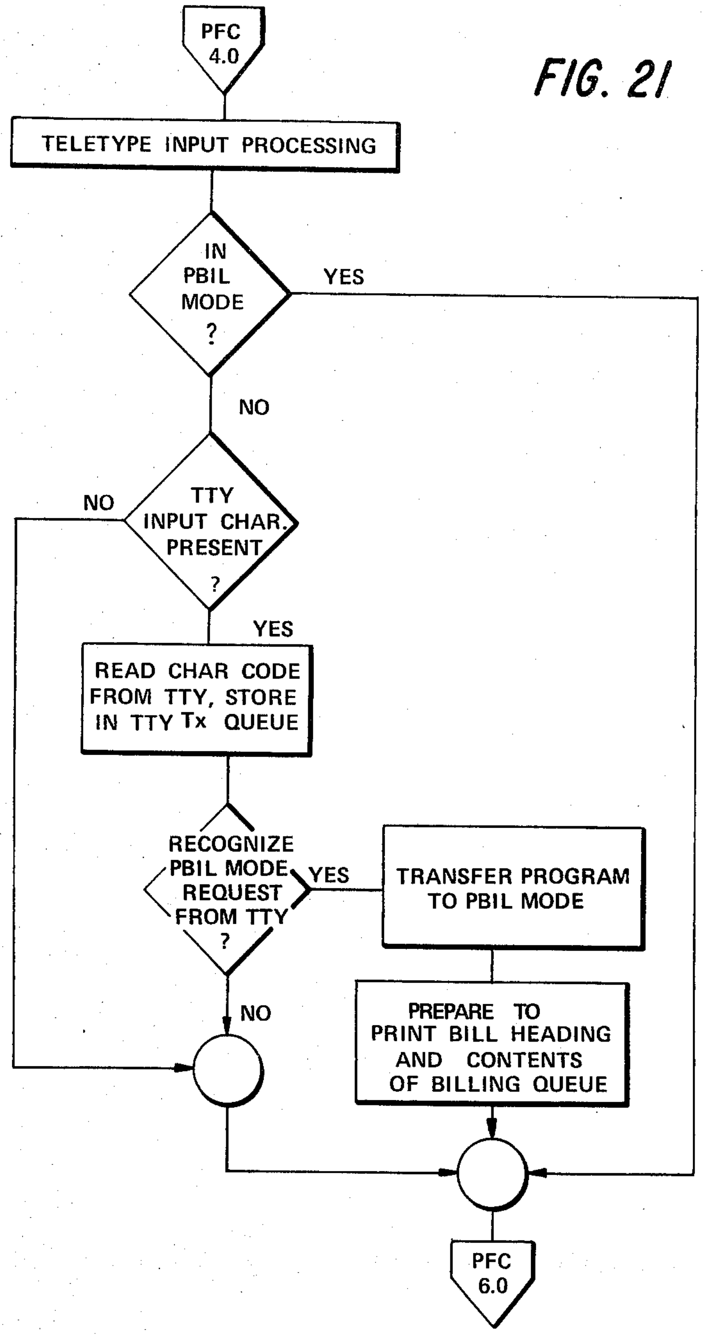
Figure 22:
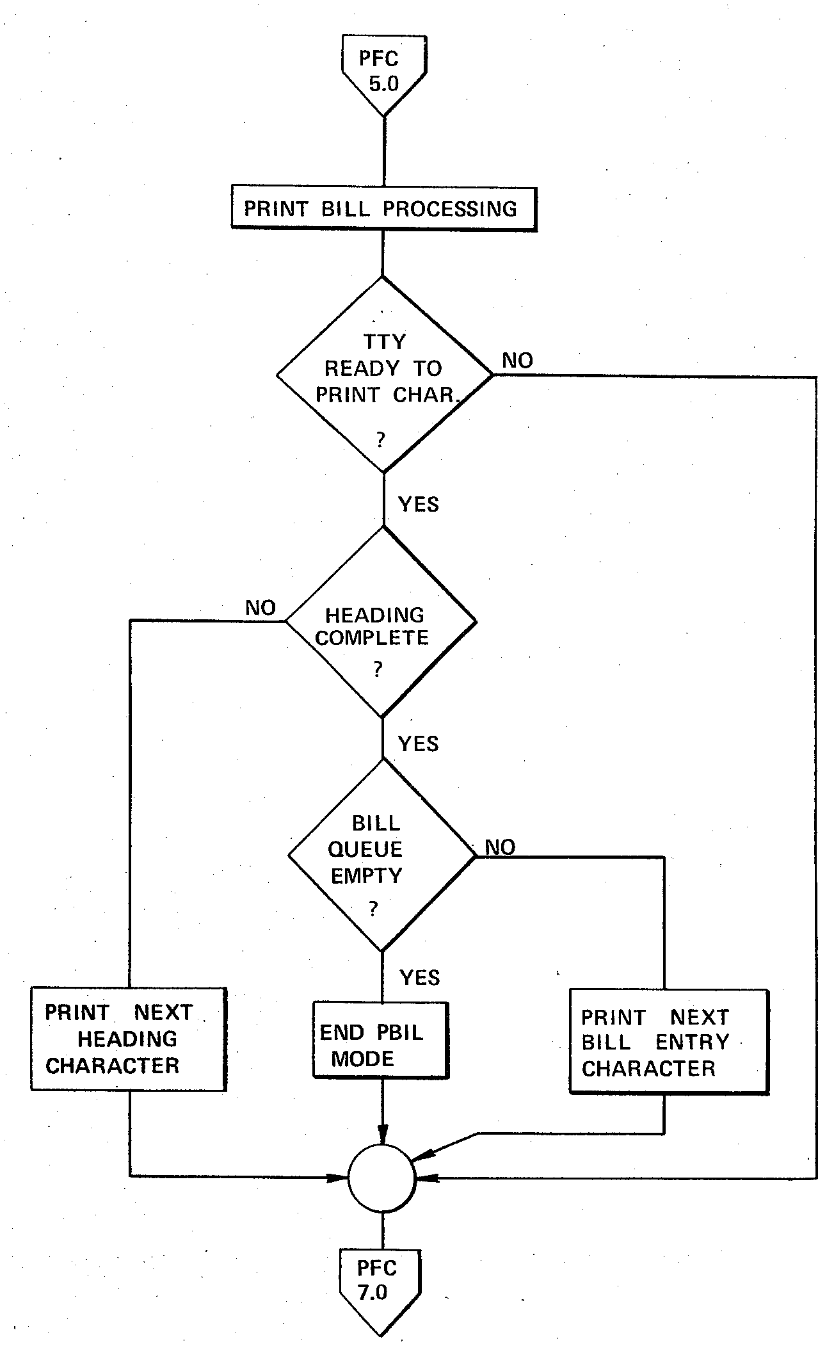
Figure 24:
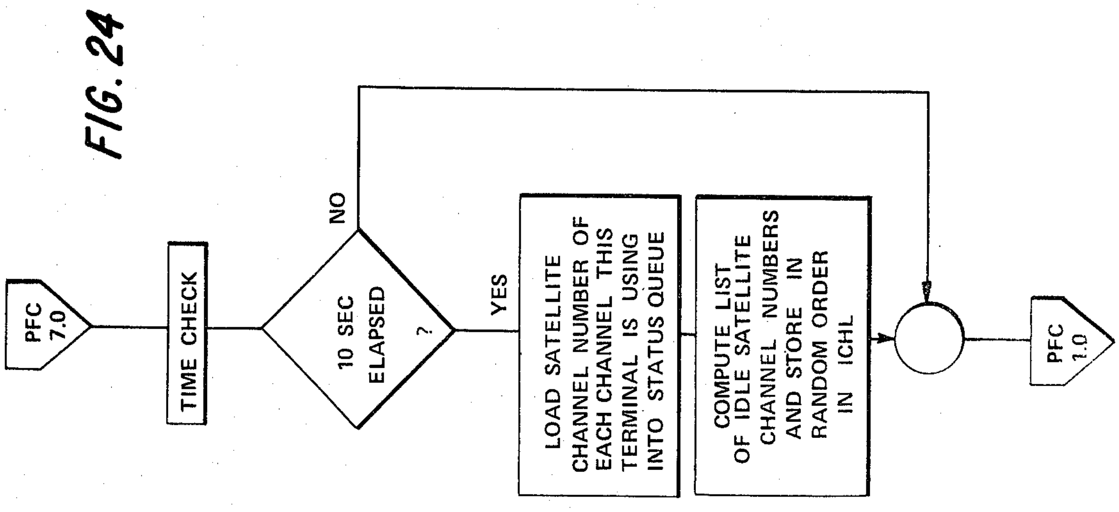
Figure 23:
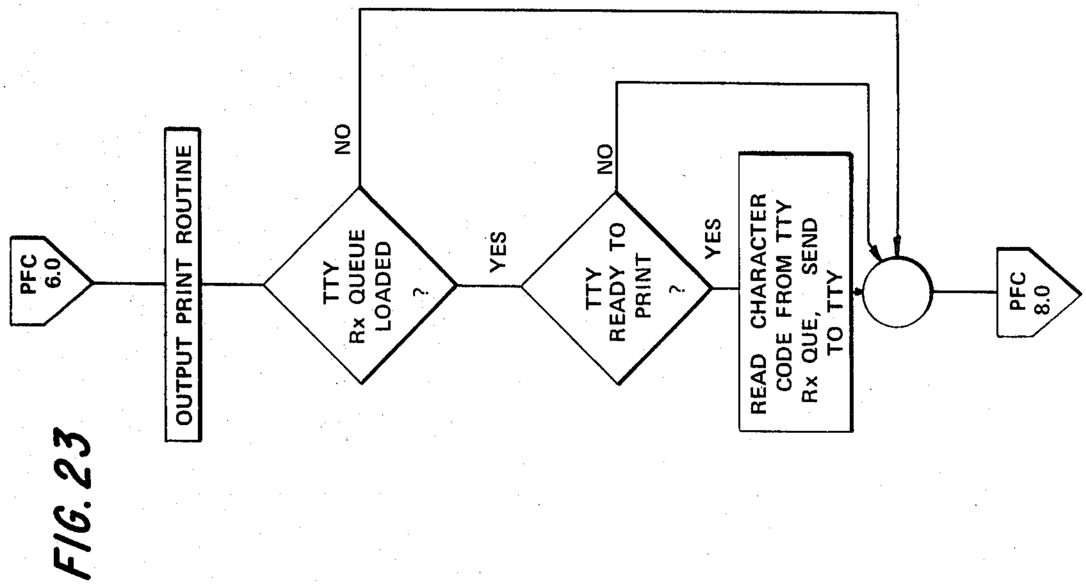

A functional block diagram of this interface is shown in FIG. 13. The ERROR and burst count bits are gated together into the SSP at the end of the receive data gate. The ERROR occupies the most significant bit and the six burst count bits occupy the least six bits of the 16 bit word input transfer.

The transfer of signalling messages between earth stations is accomplished by serially shifting the data with the most significant bit first.

The implementation of the Terrestrial Interface Unit (TIU) to be used depends on the number of voice circuits to operate as well as the type of CT–DAMA Terminal signaling used. An Individual Channel signaling interface to the CT requires the control and monitoring of the signaling registers, signaling senders, and etc., to be described hereinafter. Common channel signaling requires a lesser number of control and monitoring signal interfaces.

This interface unit is compatible with the data multiplex channel of the SSP. It includes an input-output device controller, and a discrete function decoder capable of decoding at least 64 functions. It has a 16 wire data input bus and a 16 wire data output bus. In addition, the initial device provides 32 discrete function control lines. This device is capable of expanding the number of discrete functions to 64 if required.

The supervisory and maintenance unit provides a printed language input and output between the SSP and the maintenance supervisor. As a minimum, the following functions are capable of being performed via the supervisory and maintenance unit.

a. Performance checks and printouts of malfunctions in the signaling channels and communications channel and associated equipments.

b. Diagnostic checks and printouts of nonoperating equipment functions.

c. Engineering Service circuit communications among all terminals.

d. Print listing of all calls including destination, time of call and duration of call.

e. Program loading, testing, and dumping.

Item (a) is performed during normal operation. All other functions are performed as required and controlled by the Maintenance Supervisor.

The supervisory and maintenance unit provides a printed language input and output between the maintenance supervisor and the processor. For all operations except the engineering service circuit, the language used may be specified by the using administrations. A common working language (s) shall be mutually agreed upon by users for the engineering service circuit.

The program of each SSP performs all operational functions in a like manner at each DAMA Terminal. This requirement is necessary to assure operational compatibility between all distant autonomoun terminals (up to 49) and to provide for a maximum operating efficiency. The program is a real-time continuous flow type. The various subroutines of the loop are entered depending on the input data received either from the CT or from the other DAMA Terminals via the CSC. The program is capable of completing one loop through any path of the program within one millisecond which is the CSC data burst receive rate. The data rate between the CT and DAMA Terminal is slower and therefore is not a critical parameter of the program.

The basic processing routines of the program are as follows:

a. CSC Receive
b. CSC Transmit
c. TIU Receive
d. TIU Transmit
e. Terrestrial Link Receive
f. Terrestrial Link Transmit
g. Error Control Receive
h. Error Control Transmit
i. Engineering Service Circuit Receive
j. Engineering Service Circuit Transmit
k. Access Circuit Status Receive
l. Access Circuit Status Transmit
m. Satellite Circuit Status Receive
n. Satellite Circuit Status Transmit
o. Teletypewriter Receive
p. Teletypewriter Transmit
q. Call Time Logging
r. Relative Time Check
s. Maintenance Supervisor Alarm
t. Continuity Check Receive
u. Continuity Check Transmit
v. DAMA Terminal Diagnostic The program flow charts for several of these routines are included in FIGS. 14 through 24 as examples of typical requirements.

3. Terrestrial Interface Unit (TIU).

The DAMA Terminal is designed to be operated by most types of models of international telephone exchanges. Because of the variations in workings of the various telephone exchanges two basic types of CT to DAMA Terminal interfaces have been designed.

The Individual Channel Signaling interface entails the communication of all signaling with the individual access circuits. Modified line signaling and trunk circuit relay group equipments are required at the earth station such that the normal signaling of a CT may be detected and appropriate responses returned to the CT without requiring any modifications to the operation of the existing CT. This type of system interface may be used with the CCITT No. 4, 5, 5 bis and R–2 Signaling Systems. These signaling systems are standardized by the International Telegraph and Telephone Consultative Committee and are described in the following references:

IIIrd Plenary Assembly, Geneva, June 1964; Blue Book, Volume VI, Part IX: Specifications for CCITT Signalling System No. 4.

IIIrd Plenary Assembly, Geneva, June 1964; Blue Book, Volume VI, Part X: Specifications for CCITT Signalling System No. 5.

IVth Plenary Assembly Document No. 52 (Study Group XI – Document No. 167) June 1968, Specifications for CCITT Signalling System No. 5 Bis.

IVth Plenary Assembly, Mar del Plata, 1968; White Book, Volume VI, Part XVI: Specifications for CCITT Signalling System R2 (to be published in 1969).

Figure 25:
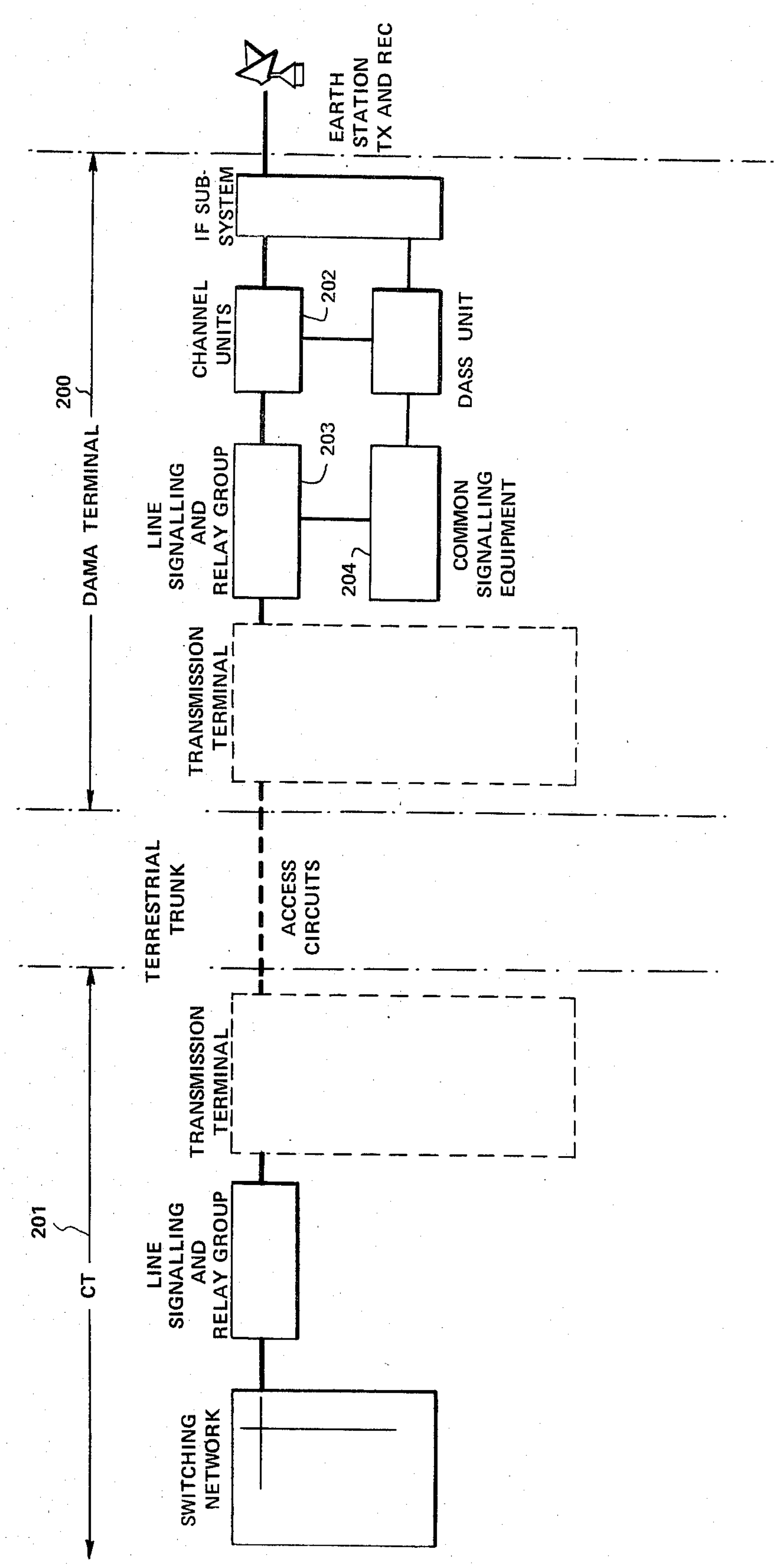
FIG. 25 is a functional block diagram of the individual channel signaling terrestrial interface unit.
Figure 25A:
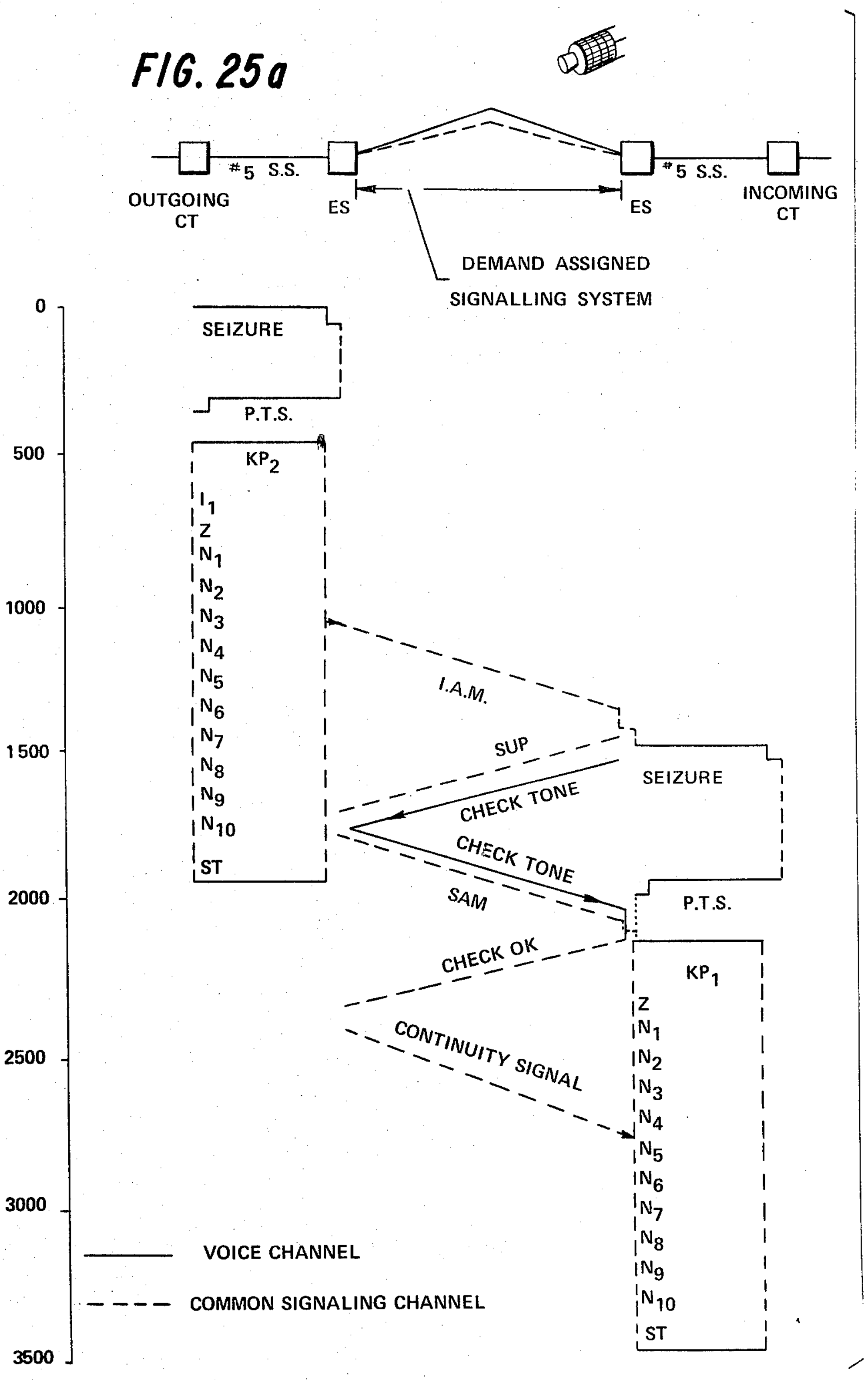
FIG. 25*a* is a time sequence chart of a typical call operating through the interface unit shown in FIG. 25.

FIG. 25 is a simplified functional block diagram of this interface. FIG. 25*a* is a simplified time sequence chart of a typical call operating through this interface.

The Common Channel Signaling interface entails the communication of all signaling between the CT and the DAMA Terminal via a separate 2400 bit per second signaling channel. This type of interface is designed to be compatible with the proposed CCITT No. 6 Signaling System.

IVth Plenary Assembly, Mar del Plata, 1968; White Book, Volume VI, Part XIV: Specifications for CCITT Signalling System No. 6 (this part has been published separately).

Figure 26:
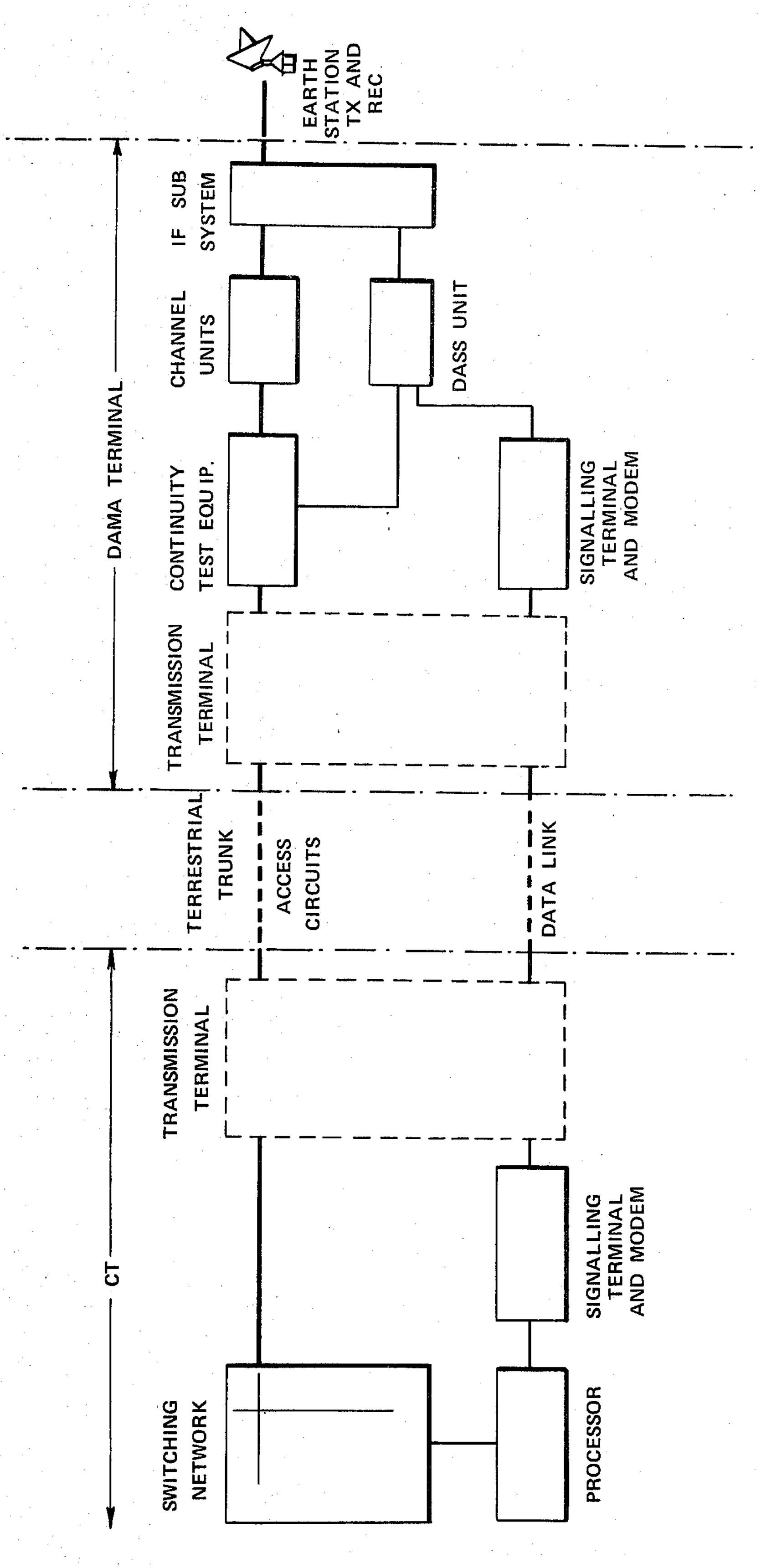
FIG. 26 is a functional block diagram of the common channel signaling terrestrial interface unit.
Figure 26A:
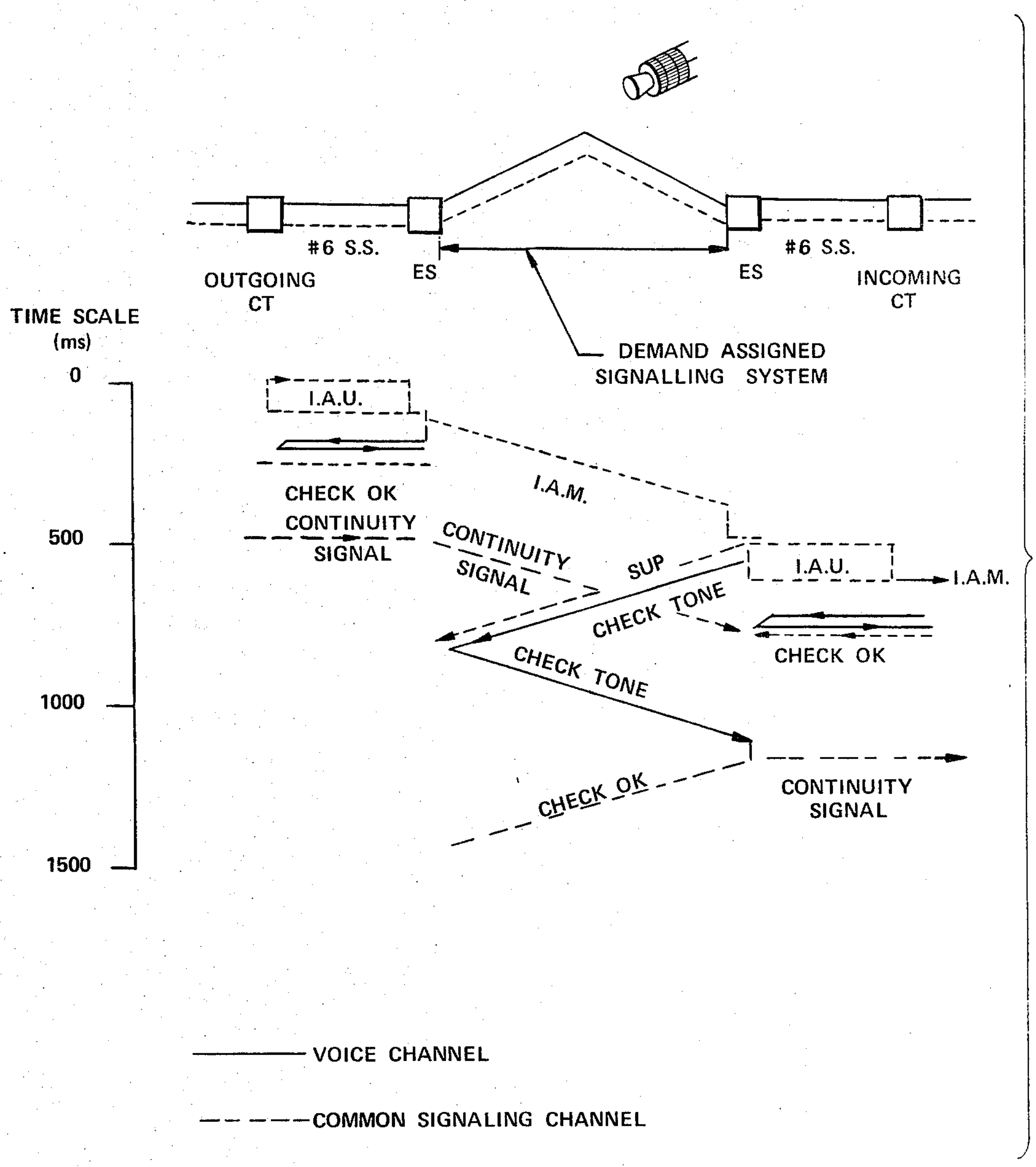
FIG. 26*a* is a time sequence chart of a typical call operating through the interface unit shown in FIG. 26.

No changes to CCITT No. 6 signaling format or operating procedures will be required to accomplish this interface. With the installation of appropriate equipment in existing CT's, a common channel signaling may also be used between CT and the DAMA Terminal. FIG. 26 is a simplified functional block diagram of the Common Channel Signaling interface. FIG. 26*a* is a simplified time sequence chart of a typical call operating through this interface.

The CCITT No. 1 System may also be interfaced with a DAMA Terminal provided with a suitable signaling adaptor is added to the No. 1 System. Individual channel signaling identical to those used for the CCITT No. 4, 5, 5 bis, or R–2 Systems or dial pulse signaling may be used for this case. Also common channel signaling may be used in the CCITT No. 1 Signaling adaptor. In any case, the necessary numerical and supervisory information must be generated and processed by the signaling adaptor to provide a semi-automatic working interface to the terminal. The adaptor must also provide for the normal operation, monitoring and response of the operator.

The operation of the DAMA Terminal requires that each voice circuit be independently switched. Therefore, the interface between the DAMA Terminal and international telephone exchange may or may not require channel multiplexing and demultiplexing equipment depending on the total number of demand assigned circuits to be provided and the physical distance between the DAMA Terminal and the international telephone exchange. Both FIG. 25 and 26 show optional Transmission Equipment which includes the multiplexing and demultiplexing equipment. It is assumed that if these equipments are required, they will be installed and operated as required in normal CT installations.

The choice of the type of terrestrial interface to be implemented will be dependent primarily on the following parameters:

a. Type and model of the international telephone exchange.

b. Number of access circuits between the CT and DAMA Terminal.

c. Operating time to establish a circuit through the satellite and DAMA Terminals.

d. Cooperative utilization of the preassigned circuits and demand assigned circuits.

The functional requirements of the Terrestrial Interface Unit are as follows:

a. To detect and buffer all signaling information as received from the international exchange.

b. To connect the four-wire full duplex voice circuits as required to properly initiate, supervise and terminate a call.

c. To buffer and transmit all signaling information to be transmitted to the international exchange.

d. To conduct a circuit continuity test upon establishment of each new satellite circuit.

The functional requirements listed above in paragraphs (a) and (c) require different equipments depending on the type of interface to be implemented. The function requirements listed above in paragraphs (b) and (d) are always provided by the same equipment regardless of the type of interface provided.

An Individual Channel Signaling interface may be used between a DAMA Terminal 200 and the CCITT No. 4, 5, 5 bis or R–2 type international signaling systems. The functional configuration for each of these possible interfaces is similar. Only the detailed performance of certain functions differ among these interfaces.

Each four-wire duplex audio circuit connected to the CT 201 is routed to a DAMA Terminal Channel unit 202 via the line signaling equipment and trunk circuit relay group 203. Common trunk equipment 204 such as the receive multiple frequency (MF) signaling register, transmit MF signaling sender, and continuity test transceiver are connected only when necessary by the link switch and link marker. The number of individual units required of each common trunk equipment may be determined by normal traffic engineering procedures and system reliability considerations. The interface buffer controller allows the signaling and switching processor to monitor and control all signaling and control operations occurring within the Terrestrial Interface Unit.

The Terrestrial Interface Unit for a DAMA Terminal interfaced with a CCITT No. 5 Signaling System using the normal individual channel signaling procedures are implemented using standard equipment with appropriate modifications. The modifications allow the Signaling and Switching Processor to monitor and control the line and register signals as received and transmitted from and to the CT; to facilitate control of the trunk circuit relay group switchings; and to control the switching and signaling required for circuit continuity checking. The Terrestrial Interface Unit (TIU) is installed and operated in the same way as the addition of a new trunk between two CCITT No. 5 exchanges. The detailed workings and operating procedures of the TIU are the same as specified for the CCITT No. 5 exchange unless otherwise noted. Similarly, the signal levels and timing requirements are the same as specified for the CCITT No. 5 exchange unless otherwise noted.

Figure 27:
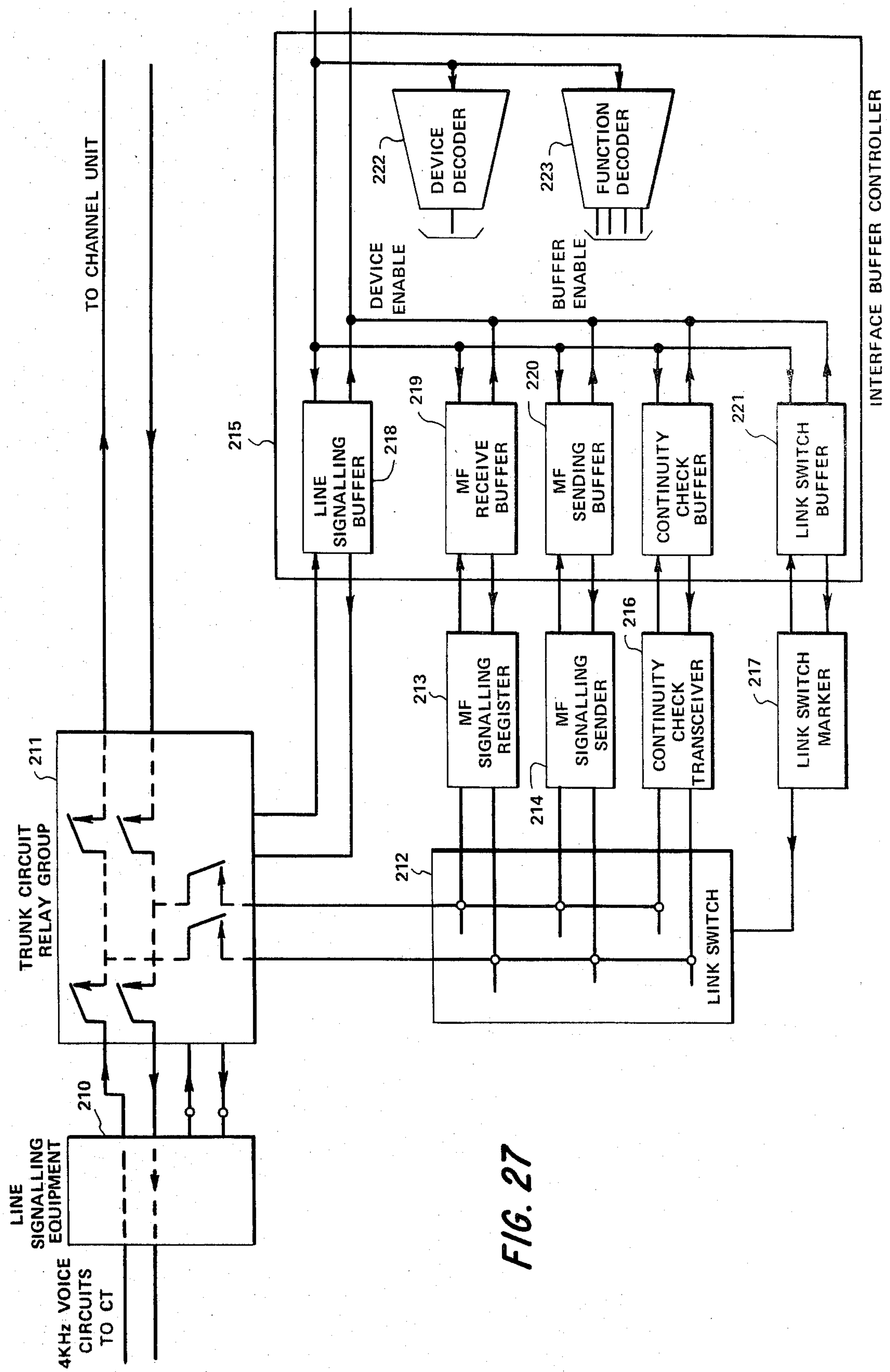
FIG. 27 is a detailed block diagram of the individual channel signaling terrestrial interface unit.

If an Individual Channel Signaling interface is to be used with a CCITT No. 5 international signaling system, the following equipment is required at the DAMA Terminal:

a. Line Signaling Equipment
b. Trunk Circuit Relay Group
c. Continuity Check Transceiver
d. Link Switch
e. Link Switch Marker
f. MF Signaling Register
g. MF Signaling Sender
h. Interface Buffer Controller The functional configuration of these equipments is shown in FIG. 27.

Figure 28C:
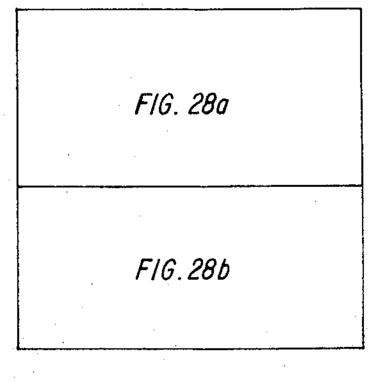
FIG. 28*c* is a map of FIGS. 28*a* and 28*b*.

The Line Signaling Equipment (LSE) 210 provides for a four-wire, 600 ohm, balanced duplex circuit interface to both the access circuits and the trunk circuit relay group 211 for each access circuit interfaced to the DAMA Terminal. The LSE 210 also monitors, "Splits" and transmits the 2400 Hz and 2600 Hz tones in the same manner as is done in the normal workings of a CCITT No. 5 Signaling System. A detailed circuit diagram of the LSE is shown in FIG. 28.

In addition to the voice circuit interface, the LSE 210 provides two each contact closure signals (LSR and LSP) plus two each relay coil drive signals (LSS and LST) to $f_1$ and $f_2$ line signaling frequencies for each access circuit interfacing with the DAMA Terminal. These signals are interfaced with the line signaling buffer of the Trunk Circuit Relay Group 211. The operation, performance and timing of all line signals is the same as specified for the CCITT No. 5 exchange except the seize and proceed-to-send signaling from the DAMA Terminal to the CT is energized by the SSP.

The LSE 210 also contains normal test facilities, voice circuit amplifiers, attenuators and test plugs to facilitate normal CCITT No. 5 operational monitoring and testing.

Figure 28A:
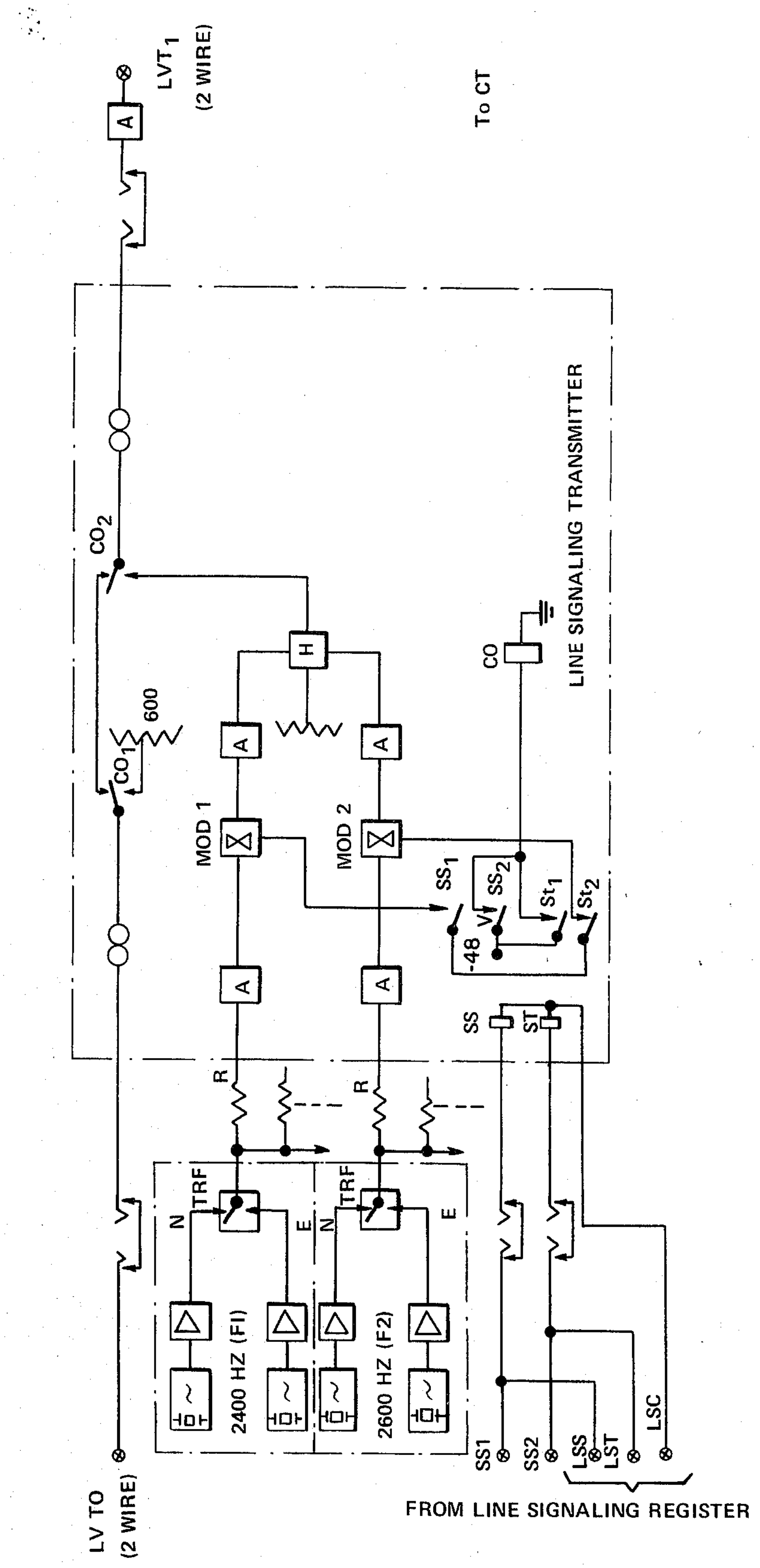
FIGS. 28*a* and 28*b*, taken together, are a detailed circuit diagram of the line signaling equipment for the individual channel signaling terrestrial interface unit.
Figure 28B:
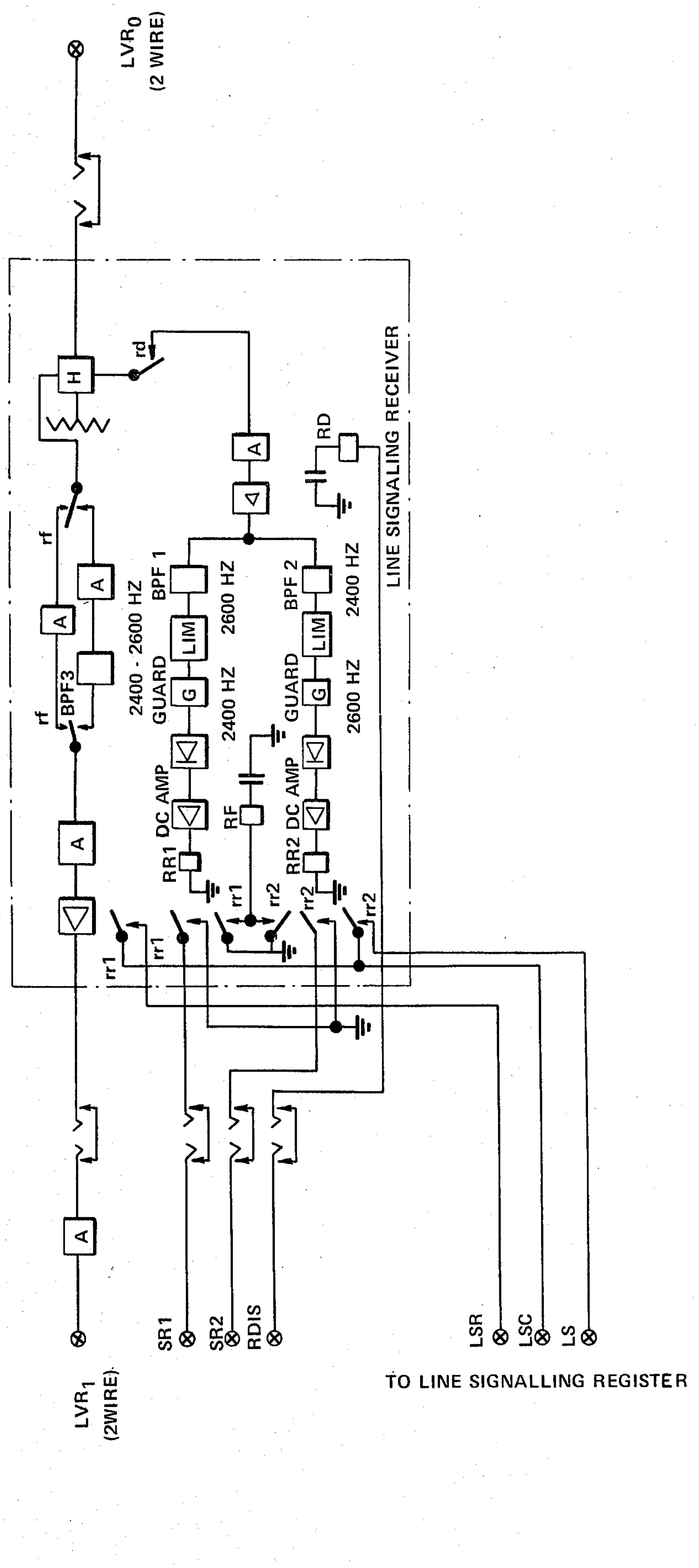

FIGS 28*a* and 28*b* illustrates an access circuit showing the typical interface to the LSE. It should be noted that this diagram does not show all LSE equipments but is provided to show the interface for a typical access circuit.

The Trunk Circuit Relay Group 211 is capable of connecting any four-wire voice circuit from the CT to either the associated channel unit or the link switch 212. The operational functions provided are:

a. To connect each four-wire circuit between the common equipment and the international exchange as required to provide for the normal line and register signaling operation of the CCITT No. 5 System.

b. To connect the transmission and reception of a continuity test tone transceiver or return strap between the channel units and the common equipment as required for individual link continuity checks or between the channel units and the access circuits for end-to-end circuit continuity checks.

c. To connect a busy signal on the terrestrial circuit as required for signaling a busy status of all satellite circuits busy or all access circuits busy at a distant specified Terminal.

The trunk circuit switching for each access circuit is controlled by the SSP via the line switching signals LSF and LSG. The operational state of each trunk circuit relay group is according to the following table:

| F | G | Operational State |
|---|---|---|
| 0 | 0 | Conversation and Circuit Continuity Check |
| 1 | 0 | Terrestrial Signaling |
| 1 | 1 | Link Continuity Test (satellite circuit) |

All other states are disallowed.

Figure 29:
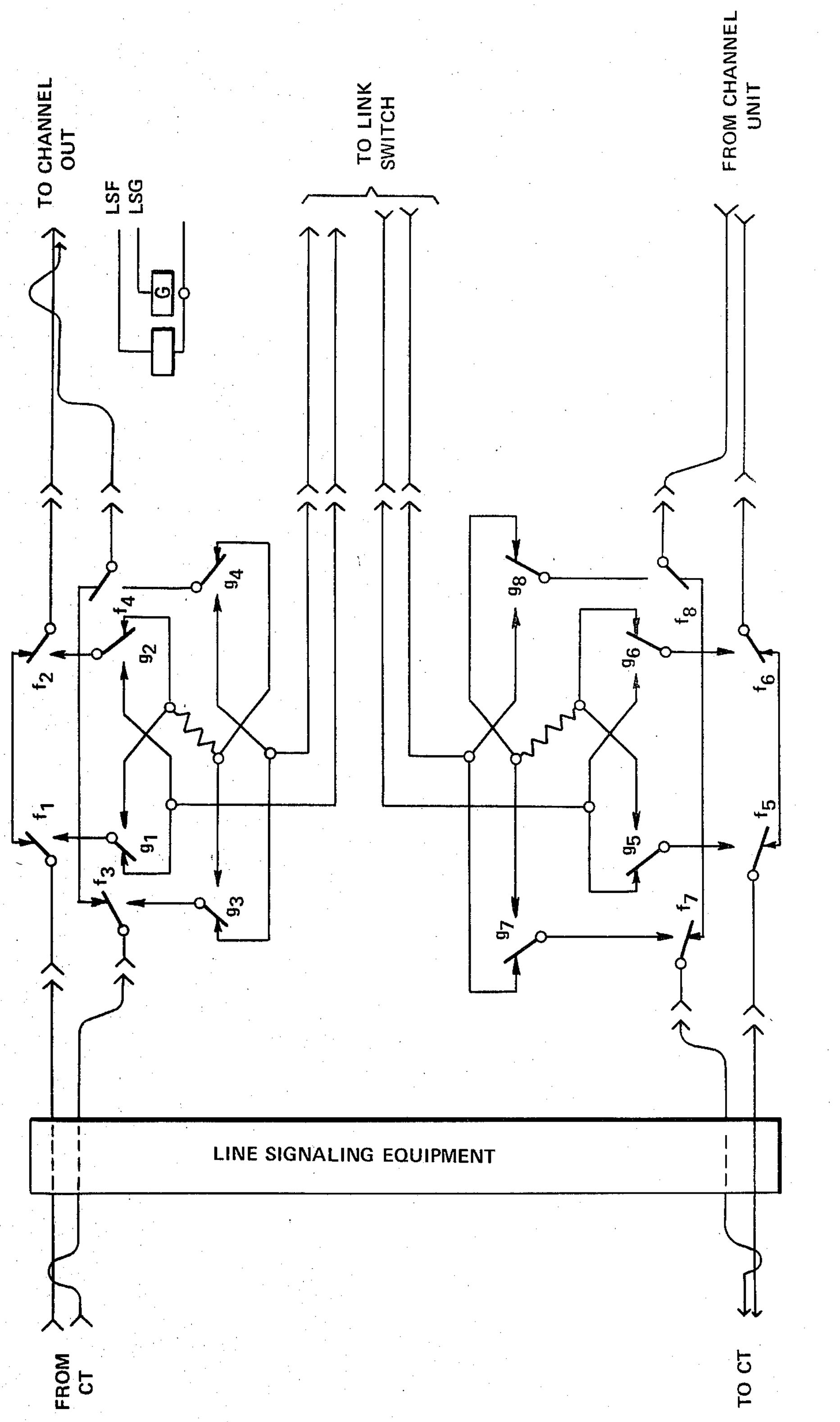
FIG. 29 is a detailed circuit diagram of the trunk circuit relay group for the individual channel signaling terrestrial interface unit.

FIG. 29 is a circuit diagram of one access circuit in a typical trunk circuit relay group. This diagram does not represent the total configuration required for the relay groups but is intended to show the interface required to permit control of the line switching by the SSP.

Figure 30:
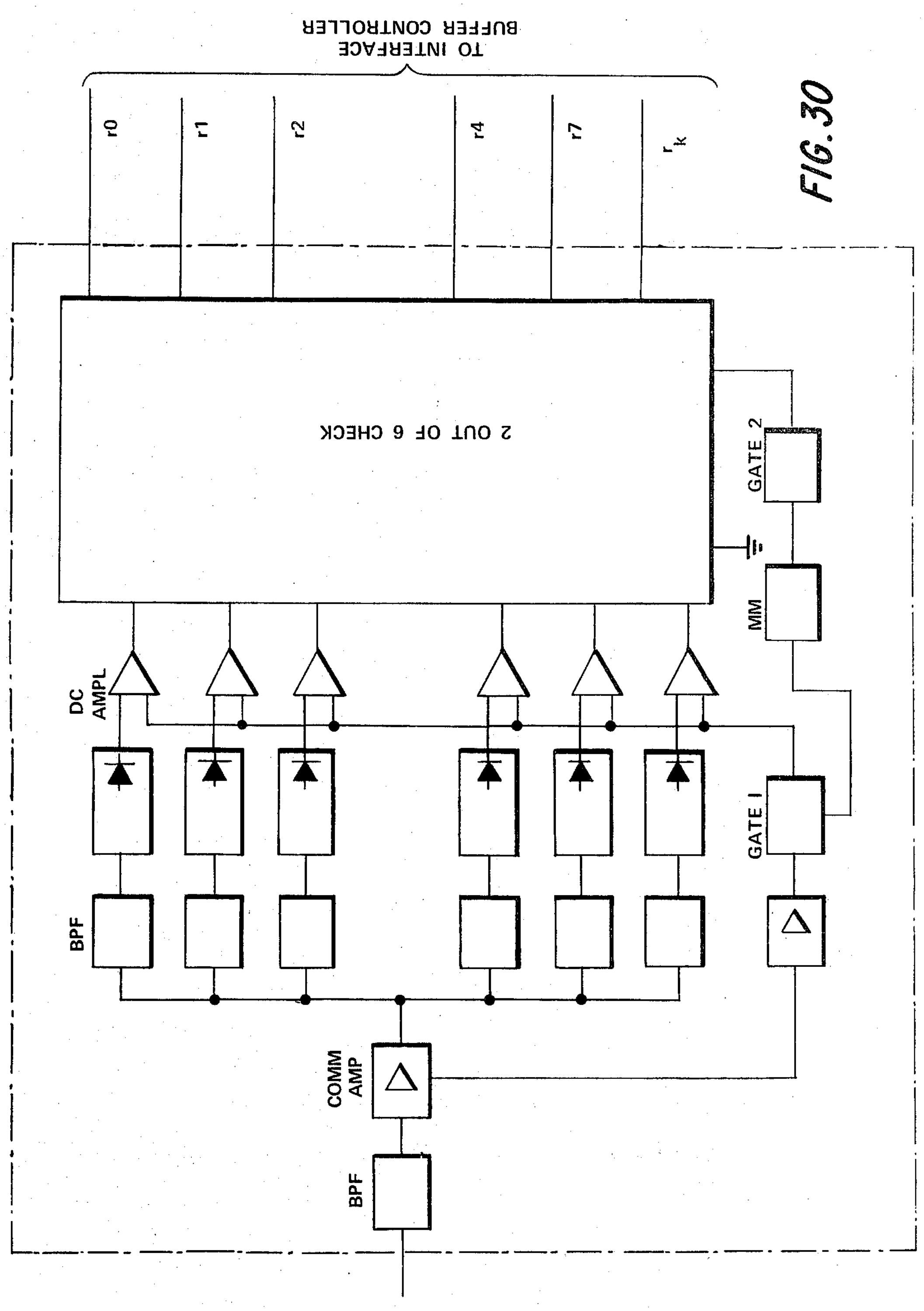
FIG. 30 is a block diagram of the multiple frequency signal register for the terrestrial interface unit.

The MF Signal Register (MSR) 213 has the capability to detect each of the six MF register signaling frequencies, perform a two out of six check, and hold the link switch 212 until released by the SSP. Whenever the SSP detects that a call is being initiated by the CT, the SSP switches the circuit to an available MS. The MSR 213 holds this circuit until released by the SSP and sequentially detects the digits as received from the CT. The SSP periodically samples the status of the register to determine the value of each received digit. A total of six signaling frequency outputs ($r_0$, $r_1$, $r_2$, $r_4$, $r_7$, and $r_k$) are provided to indicate the value of the received digit to the SSP. FIG. 30 is a functional block diagram of an MSR.

Figure 31:
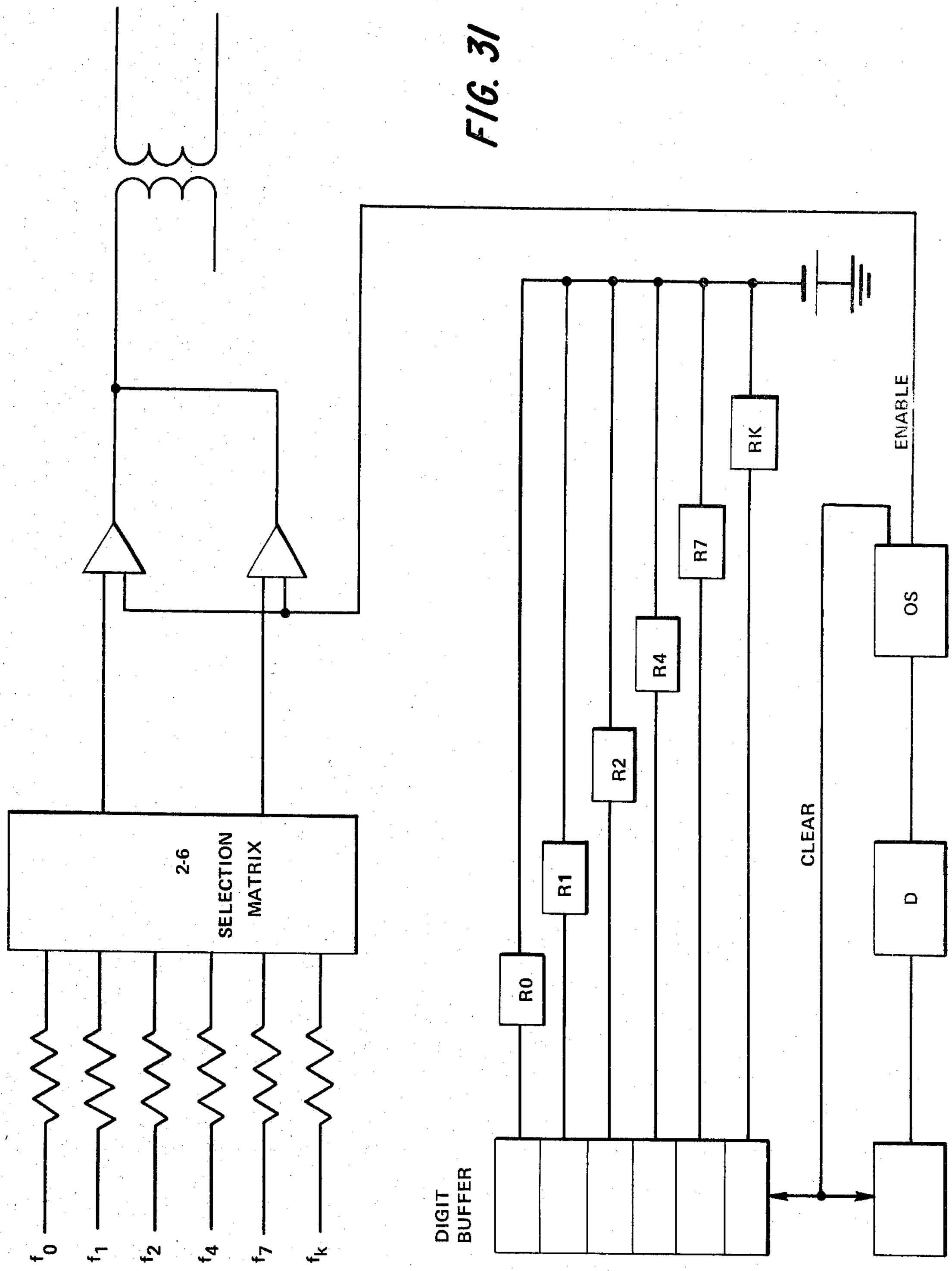
FIG. 31 is a block diagram of the multiple frequency signaling sender for the terrestrial interface unit.

The MF Signaling Sender (MSS) 214 operates in the normal manner to emit two-out-of-six tone burst for each character loaded into the register by the SSP. The SSP selects the appropriate access circuit and the MSS holds that circuit until signaling is completed. Each digit is received from the SSP in a 2 out of 6 pattern. Upon loading the digit into the buffer 215, the MSS transmits a timed burst of the appropriate two tones. Upon completion of the tone bursts, the digit buffer is cleared. Refer to FIG. 31 for a functional block diagram of the MSS.

Each station has the option of conducting checks either on a link-by-link basis or on an end-to-end basis. If the circuit continuity is to be performed on a link-by-link basis, then, the SSP switches the Continuity Check Transceiver (CCT) 216 so that it will emit a 2,100 Hz tone of 120 milliseconds duration and register the return receipt of at least 100 milliseconds of that tone when operating as the called DAMA Terminal. The SSP controls the application of the loop when operating as the calling DAMA Terminal. If continuity is not achieved on a channel unit, an alarm is set by the SSP.

When performing the continuity check on an end-to-end basis the access circuit is switched to the voice mode. If a continuity Check-Not-OK is received from the destination, then the SSP initiates a continuity test on the applicable channel unit to determine if the failure was in the DAMA Terminal or terrestrial facilities. If a continuity test failure is received on this test, an alarm is set by the SSP.

Circuit continuity for the demand assigned satellite circuit is always initiated in the backward direction. Thus, the called DAMA Terminal initiates the tone energizing the appropriate relays in the Trunk Circuit Relay Group 211 and waits a total of 700 milliseconds for its return. (If double satellite links are allowed in the future the total waiting time would be extended to 1.5 seconds for an end-to-end check.) The calling DAMA Terminal returns the received test tone via the loop direct to the called terminal. Failure to receive the returned test tone in the specified time results in the transmission of the Check-Not-OK signal.

Figure 32:
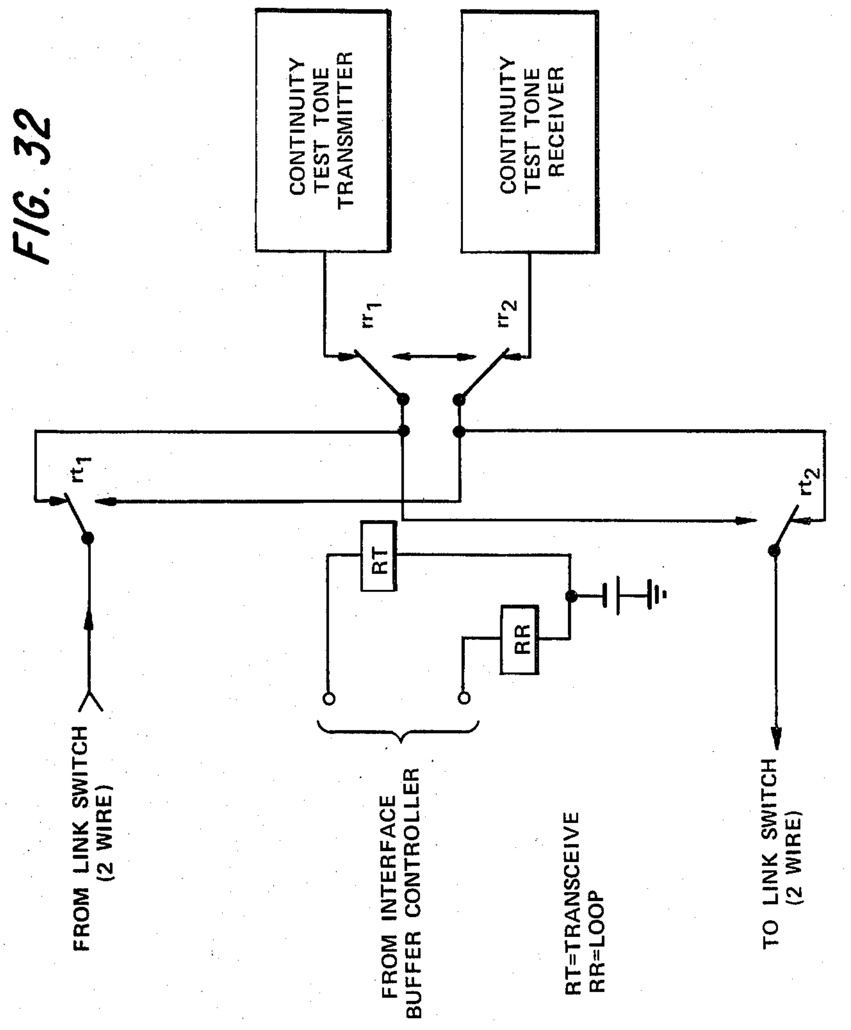
FIG. 32 is a block diagram of a continuity test tranceiver for the terrestrial interface unit.

FIG. 32 is a simplified diagram of one transceiver.

The Link Switch 212 and Marker 217 (LSM) provides the capability to connect any four-wire trunk voice circuit to any of the common equipments. The connection is held until released by the SSP. The link switch 212 may be implemented with an ordinary cross bar switch. The marker 217 contains the required selection circuits and addresses buffer to permit the direct addressing, holding and clearing of the appropriate switching relays.

The Interface Buffer Controller (IBC) 215 provides buffered electronic input and output registers and the necessary control logic to permit parallel transfer of the monitoring and control data between the TIU and the SSP. Wherever the information interface is between an electronic and electromechanical circuit this interface provides a relay contact from the appropriate equipment within the Terrestrial Interface Unit.

Figure 33:
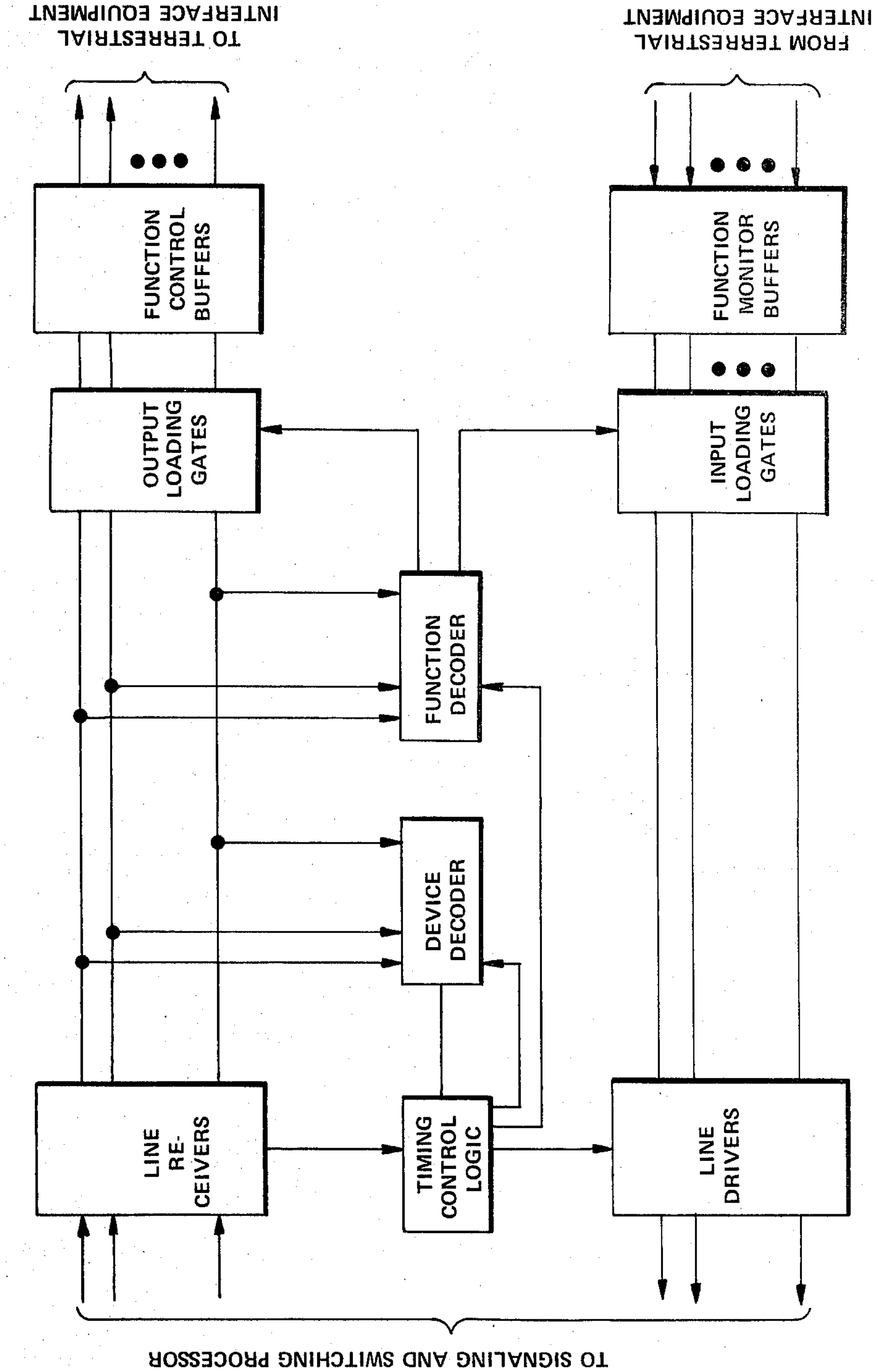
FIG. 33 is a block diagram of the interface buffer controller for the individual signaling channel interface.

The IBC 215 consists of a common data transfer control unit, a common input and output data bus, a line signaling buffer 218, an MF sender buffer 220, and a link switch buffer 221. Refer to FIG. 33 for a simplified functional diagram of this unit.

The common data transfer control unit contains the data line receivers and transmitters, access control logic to transfer data into and out of the SSP plus a device and a function decoder 222 and 223. The device decoder 222 is used by the SSP to select the TIU interface, whereas the function decoder 223 controls which buffer within the device is being read or set.

The line signaling buffer 218 contains four bits buffering (two output control and two input detection) for each access circuit. The buffered output bits are capable of being set either individually or simultaneously by the SSP and, when set, they cause the $f_1$ and $f_2$ tones to be transmitted. These bits are automatically reset. The buffered input bits are set by the normal receipt of $f_1$ and $f_2$ tone detectors. They are periodically sampled by the SSP and reset upon transfer of their condition into the SSP. The line signaling buffer also detects when the operating mode for link continuity test is selected.

The MF Receive buffer 219 contains six bits for each MFR used in the Terrestrial Interface Unit. These buffers are periodically sampled only when the SSP has selected an access circuit to be connected to the designated MFR. The MF transmit buffer 220 also contains six bits for each MFS used in the Terrestrial Interface Unit. They are sequentially set only when the SSP has selected an access circuit to be connected to the MFS.

The link marker buffer 221 contains six bits for each MFR, MFS and CTT contained in the Terrestrial Interface Unit. The SSP is capable of independently addressing each six bits such that any one of sixty access circuits may be independently switched to any one of the common equipments.

The Terrestrial Interface Unit for a DAMA Terminal interfaced with a CCIT No. 5 bis Signaling System using individual channel signaling may be implemented similarly to that specified above for CCITT No. 5 system. The primary changes required to make the CCITT No. 5 interfaces compatible with the CCITT No. 5 bis system are procedural changes in the Signaling and Switching Processor programs. These changes include the addition of operational procedures required to conform to the backward register signaling.

The Terrestrial Interface Unit for a DAMA Terminal interfaced with a CCITT R–2 Signaling System may be implemented in a manner similar to that specified for the CCITT No. 5 bis interface. As the line signaling part of the R–2 system employs continuous outband signaling, the line signaling equipment of the Terrestrial Interface Unit will in this case also contain a carrier terminal provided with the Interruption Control facility specified for the R–2 system.

The Terrestrial Interface Unit for a DAMA Terminal interfaced with a CCITT No. 4 Signaling System may be implemented in a manner similar to that specified for the CCITT No. 5 bis interface. As the signaling part of the No. 4 system employs only two frequencies, the MFR and MSS are implemented using two frequency detectors and senders.

Common Channel Signaling may be used with any international telephone exchange provided that the information format and signaling procedure is appropriately modified; however, the Terrestrial Interface Unit for a DAMA Terminal interfaced with a CCITT No. 6 Signaling System may utilize common channel signaling equipments without modifications plus some additional equipments required to switch and test the individual satellite voice circuits. The interface consists of the following equipments:

Trunk Circuit Relay Group
Continuity Check Transceiver
Signaling Modem
Signaling Terminal
Interface Buffer Controller

LINK SWITCH AND MARKER

Figure 34:
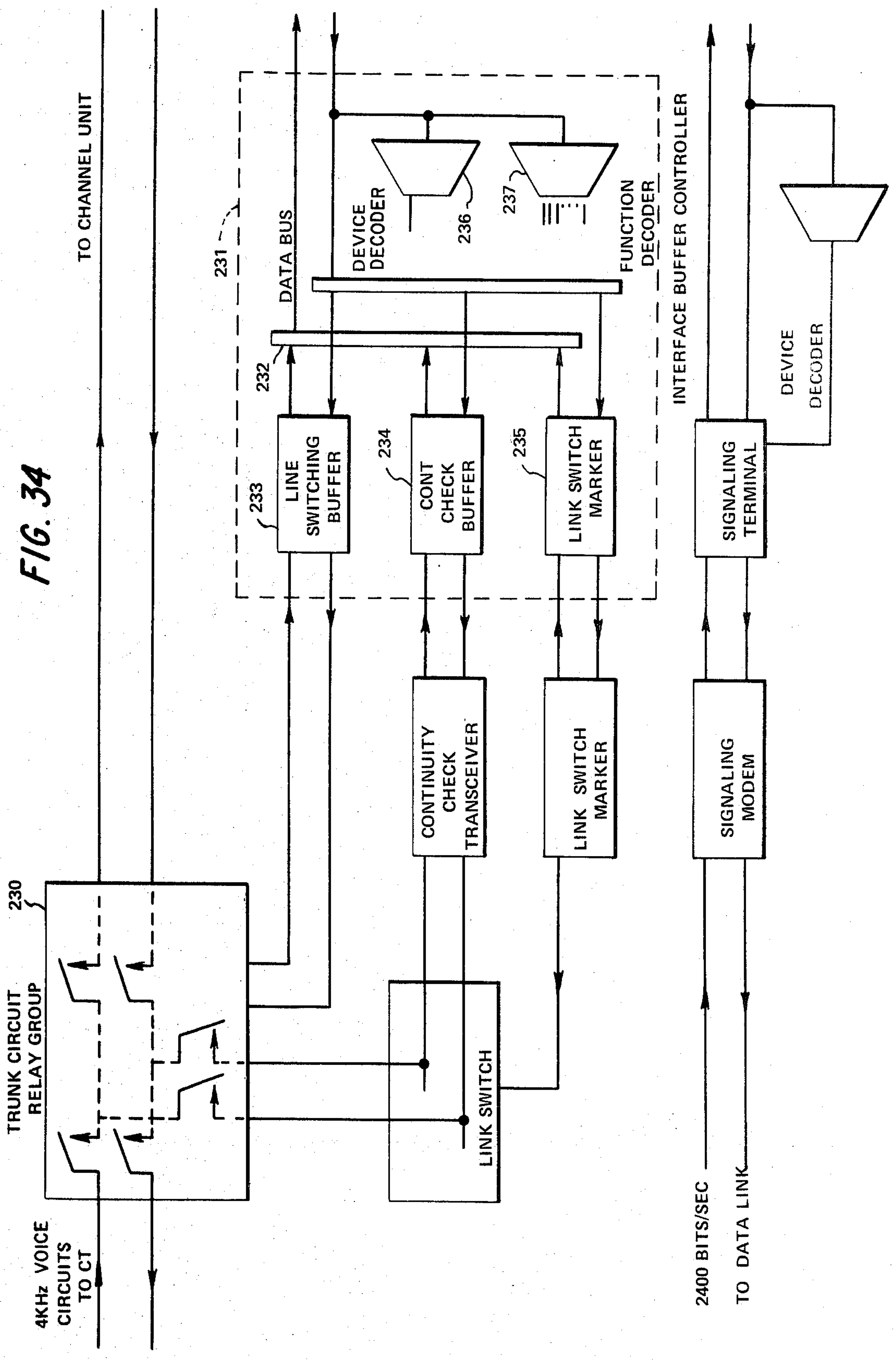
FIG. 34 is a detailed block diagram of the common channel signaling terrestrial interface unit.

Each four-wire duplex audio circuit interfaced to the DAMA Terminal is switched between the channel units and the continuity check transceivers. The check tones on each circuit conforms to the normal voice channel operational levels. All signaling to and from the CT is conducted via the common signaling channel (2,400 bits per second) between the international telephone exchange and the earth station. A functional block diagram of this interface is shown in FIG. 34.

The Trunk Circuit Relay Group 230 consists of the necessary four-wire full duplex voice switching circuits such that each access circuit may be independently switched between the respective channel unit or any one of the continuity check transceivers. It also provides the capability for performing a link continuity on the the satellite circuit.

Each access circuit requires three signals for switching control.
Their function and operating codes is as follows:

| Function | RR | RS | RT |
|---|---|---|---|
| Normal Voice Mode | 0 | 0 | 0 |
| Satellite Link Continuity Check | 0 | 1 | 0 |
| Satellite Link Check Loop | 1 | 1 | 0 |
| Terrestrial Link Continuity Check | 0 | 0 | 1 |
| Terrestrial Link Check Loop | 1 | 0 | 1 |

All other codes are not to be used.

It should be noted that FIG. 34 presents only the interface for a single access circuit and does not represent the total configuration.

Common Continuity Check Transceivers (CCT) are used. The required number of CCT's is in accordance with normal traffic engineering practices and reliability practices. Each station has the option of conducting continuity checks either on a link-by-link basis or on an end-to-end basis. In all cases the continuity check is initiated in the backward direction.

Upon receipt of the appropriate message via the common channel (Initial Address Message), a continuity check transceiver is connected to the appropriate link provided a link-by-link test is to be conducted. A 120 millisecond tone burst (2,100 Hz) is automatically emitted upon selecting and switching the CCT to the appropriate satellite circuit. The return of the same tone burst for a minimum of 100 milliseconds and within 700 milliseconds of initiation of transmission constitutes a proper check of the circuit continuity. (If double satellite links are allowed in the future the total loop transmission time would be extended to 1.5 sec.) If a circuit fails to complete continuity, then the SSP initiates an alarm and issues a check-not-ok signal.

If the continuity check is to be conducted on an end-to-end basis, then the respective Trunk Circuit Relay Group circuits are switched to the normal voice mode upon receipt of an initial address message.

FIG. 32 is a functional block diagram of a typical CCT.

The Signaling Modem is a four phase PSK type operating at a data rate of 2,400 bits per second.

The Signal Terminal conforms to the operational performance and procedures specified for the CCITT No. 6 exchange. This performance includes the error control procedures, operational procedures as well as the information format. The storage required for error control on the terrestrial unit is provided by the SSP. The generation and comparison of check bit is performed by the signaling terminal equipment.

The Interface Buffer Controller (IBC) 231 provides buffered electronic input and output registers and the necessary control logic to permit parallel transfer of the monitoring and control data between the TIU and the SSP. Wherever the interface is between an electronic and electromechanical circuit this interface provides a relay contact closure for the appropriate equipment within the Terrestrial Interface Unit.

Figure 35:
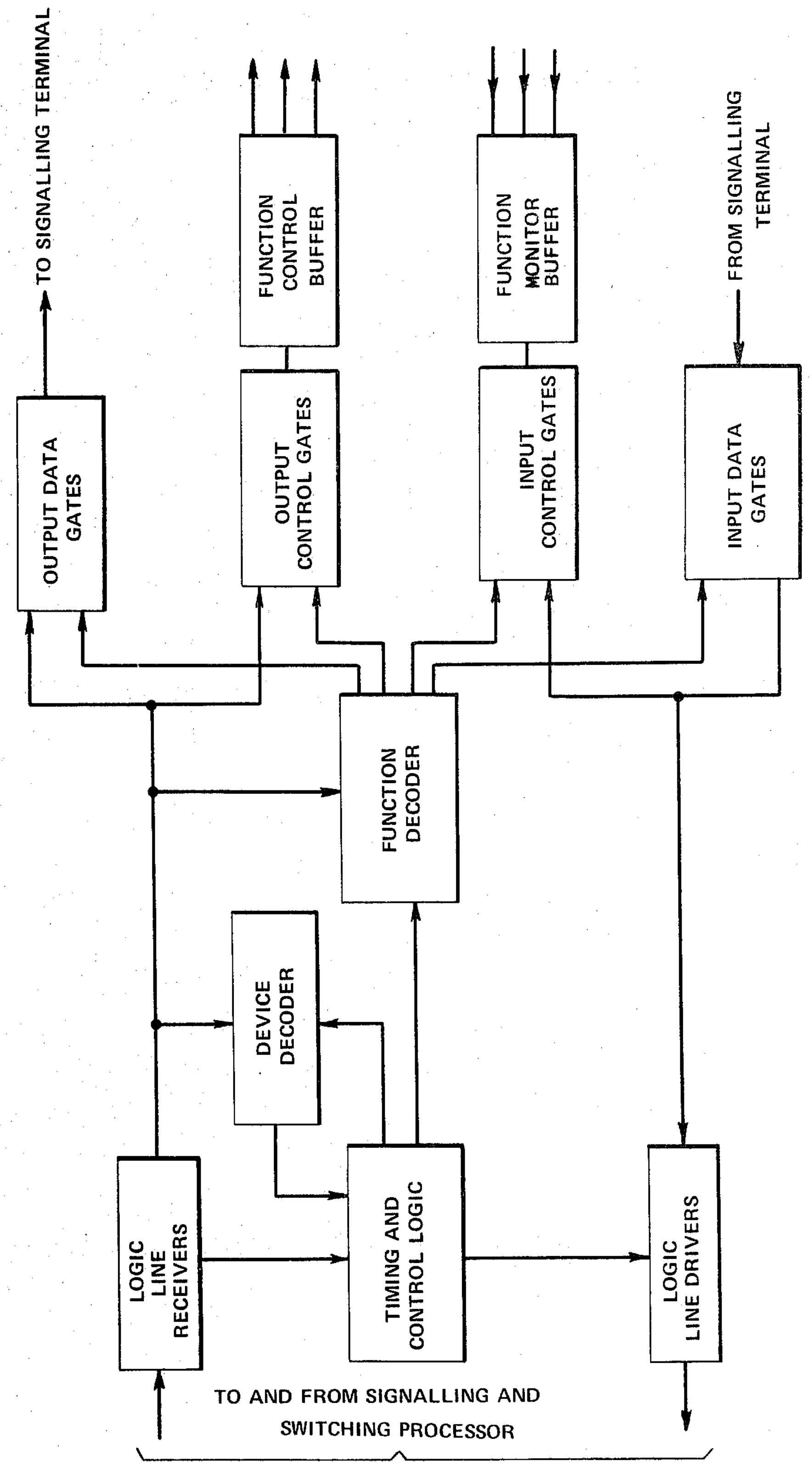
FIG. 35 is a block diagram of the interface buffer controller for the common signaling channel interface.

The IBC 231 consists of a common data transfer control unit, a common input data bus 232, a line signaling buffer 233, continuity check buffer 234, and a link switch buffer 235. Refer to FIG. 35 for a simplified functional block design of this unit.

The common data transfer control unit contains the data line receivers and transmitters, access control logic and a device and function decoder 236 and 237. The device decoder 236 is used to select the TIU when addressed whereas the function decoder 237 controls to and from which buffer within the TIU the data transfer is applicable.

The line switching buffer 233 contains three bits per access circuit for the control of the operating mode of the Trunk Circuit Relay Group 230. The continuity check buffer 234 contains two bits for each access circuit - one to energize the actuation of the check tone and the second to mark the proper receipt of the returned check tone. The link switch buffer 235 contains 6 bits for each continuity check transceiver such that each transceiver may connect to any one of up to 60 access circuits.

While the invention has been particularly shown and described with reference to a preferred embodiment thereof, it will be understood by those skilled in the art that various changes in form and details may be made therein without departing from the spirit and scope of the invention.

What is claimed is:

1. A method of operating a demand assigned multiple access terminal with an international telephone exchange said terminal being used for communicating to remote terminals via a satellite relay and being adapted to acquire an available satellite circuit to carry information between said terminal and said remote terminal, said method being such that the signaling between the international exchange and the demand assigned multiple access terminal is the same as if it were between two exchanges, said method comprising the steps of a. receiving at said terminal all signaling information normally provided by the exchange,
b. connecting the four-wire full duplex voice circuits from the exchange to the terminal as required to properly initiate, supervise and terminate a call,
c. transmitting all required signaling information from said terminal to the exchange, and
d. conducting a circuit continuity test upon the acquisition by said terminal of any of said satellite circuits.

2. The method as recited in claim 1 wherein the step of receiving includes receiving a seizure signal from the exchange and wherein the step of transmitting includes transmitting a proceed-to-send signal to the exchange after a register has been selected at the terminal in response to the seizure signal.

3. The method as recited in claim 1 wherein the step of conducting a circuit continuity test includes the steps of a. transmitting a check tone of fixed time duration through the satellite relay link, and
b. registering the return receipt of at least a predetermined time portion of that check tone when operating as the called terminal.

4. The method as recited in claim 3 wherein the step of registering must be performed within a predetermined time period and failure to do so results in the transmission of a check-not-ok signal from the called terminal to the calling terminal.

5. The method as recited in claim 3 wherein a check-OK signal is transmitted from the called terminal to the calling terminal if the step of registering is performed within a predetermined time period.

6. A terrestrial interface unit for connecting a demand assigned multiple access terminal used for communications via a satellite relay with an international telephone exchange which permits signaling between the international exchange and the demand assigned multiple access terminal as if it were between two exchanges, said terminal including a plurality of channel units and equipment common to all channel units for controlling the access thereto including a switching and signaling processor, said interface comprising:

a. a trunk circuit relay group for connecting any four-wire voice circuit from the exchange to an associated channel unit,
b. a continuity check transceiver connected to said trunk circuit relay group and controlled by said switching and signaling processor in said terminal for transmitting a check tone of fixed time duration through the satellite relay link via said trunk circuit relay group and for receiving the return of at least a predetermined time portion of that check tone when operating as the called terminal, and
c. An interface buffer controller connected between said trunk circuit relay group and said common equipment in said terminal, said interface buffer controller including input and output registers and control logic means for transferring monitoring and control data between the terrestrial interface unit and the switching and signaling processor in the terminal.

7. A terrestrial interface unit as recited in claim 6 wherein said interface buffer controller comprises:

a. a common data transfer control unit for transferring data into and out of the switching and signaling processor in the terminal,
b. a device decoder connected to receive data from said common data transfer control unit for selecting the terrestrial interface unit in response to coded signals from the switching and signaling processor, and
c. a function decoder connected to receive data from said common data transfer control unit for controlling the input and output registers of said interface buffer controller.

8. A terrestrial interface unit as recited in claim 6 further comprising line signaling equipment for providing four-wire duplex circuit interface to both the access circuits and the trunk circuit relay group for each access circuit interfaced to the terminal.

* * * * *